United States Patent
Vaze et al.

(10) Patent No.: US 11,828,190 B2
(45) Date of Patent: Nov. 28, 2023

(54) AIRFOIL JOINING APPARATUS AND METHODS

(71) Applicant: General Electric Company, Schenectady, NY (US)

(72) Inventors: Suhas Prabhakar Vaze, Loveland, OH (US); Timothy Trapp, Cincinnati, OH (US); Scott Sager Campbell, Columbus, OH (US); Gregory Christopher Firestone, Pickerington, OH (US); Jonathan David Mast, Lebanon, OH (US); Timothy Vernon Stotler, Columbus, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/529,656

(22) Filed: Nov. 18, 2021

(65) Prior Publication Data

US 2023/0151735 A1 May 18, 2023

(51) Int. Cl.
*B23P 6/00* (2006.01)
*F01D 5/00* (2006.01)
(Continued)

(52) U.S. Cl.
CPC .......... *F01D 5/005* (2013.01); *B23K 11/0026* (2013.01); *B23K 11/16* (2013.01);
(Continued)

(58) Field of Classification Search
CPC ... F01D 5/005; F01D 5/02; F01D 5/34; B23K 11/0026; B23K 11/16; B23K 15/0006;
(Continued)

(56) References Cited

U.S. PATENT DOCUMENTS 3,770,933 A 11/1973 Holko et al.
4,873,751 A 10/1989 Walker et al.
(Continued)

FOREIGN PATENT DOCUMENTS

DE 2319994 A1 11/1974
DE 102006033298 1/2008
(Continued)

OTHER PUBLICATIONS

Kopeliovich, Resistance Welding, Subs Tech Substances & Technologies, Apr. 23, 2010, 4 Pages.
(Continued)

*Primary Examiner* — Ryan J. Walters
(74) *Attorney, Agent, or Firm* — Fitch, Even, Tabin & Flannery LLP

(57) ABSTRACT

An airfoil component for attaching to a cropped airfoil is provided. The cropped airfoil comprises a cropped airfoil attachment section and a cropped first side opposite a cropped second side, which each extend axially between a cropped first edge and a cropped second edge to define a cropped chord length. The airfoil component comprises a body having a component first side opposite a component second side. The body defines an attachment section for attaching the airfoil component to the cropped airfoil at the cropped airfoil attachment section. The attachment section extends axially between a component first edge and a component second edge to define a component chord length, and the attachment section is oversized with respect to the cropped airfoil attachment section such that the component chord length is longer than the cropped chord length. Systems and methods also are provided.

9 Claims, 17 Drawing Sheets

(51) Int. Cl.
  *B23K 11/00* (2006.01)
  *B23K 11/16* (2006.01)
  *B23K 15/00* (2006.01)
  *F01D 5/02* (2006.01)
  *F01D 5/34* (2006.01)
  *F04D 29/32* (2006.01)
  *B23K 103/18* (2006.01)
  *B23K 101/00* (2006.01)

(52) U.S. Cl.
  CPC ........ *B23K 15/0006* (2013.01); *B23K 15/006* (2013.01); *B23K 15/0093* (2013.01); *B23P 6/002* (2013.01); *F01D 5/02* (2013.01); *F01D 5/34* (2013.01); *F04D 29/324* (2013.01); *B23K 2101/001* (2018.08); *B23K 2103/26* (2018.08); *B23P 2700/13* (2013.01); *F05D 2230/233* (2013.01); *F05D 2230/234* (2013.01); *F05D 2230/235* (2013.01); *F05D 2230/40* (2013.01); *F05D 2230/80* (2013.01)

(58) Field of Classification Search
  CPC .............. B23K 15/006; B23K 15/0093; B23K 2101/001; B23K 2103/26; B23P 6/002; B23P 2700/13; F04D 29/324; F05D 2230/233; F05D 2230/234; F05D 2230/235; F05D 2230/40; F05D 2230/80
  See application file for complete search history.

(56) References Cited

U.S. PATENT DOCUMENTS

| | | | |
|---|---|---|---|
| 4,883,216 A * | 11/1989 | Patsfall | B23K 20/00 228/119 |
| 5,109,606 A * | 5/1992 | DeMichael | B23K 11/002 228/119 |
| 5,197,190 A | 3/1993 | Coolidge | |
| 5,197,191 A | 3/1993 | Dunkman et al. | |
| 5,281,062 A | 1/1994 | Dunkman et al. | |
| 6,095,402 A | 8/2000 | Brownell et al. | |
| 6,172,327 B1 | 1/2001 | Aleshin et al. | |
| 6,173,327 B1 | 1/2001 | Aleshin et al. | |
| 6,236,585 B1 | 5/2001 | Hill | |
| 6,238,187 B1 * | 5/2001 | Dulaney | B23P 6/005 416/223 R |
| 6,326,585 B1 | 12/2001 | Aleshin et al. | |
| 6,375,421 B1 | 4/2002 | Lamma et al. | |
| 6,438,838 B1 * | 8/2002 | Meier | F01D 5/3061 228/119 |
| 6,478,545 B2 * | 11/2002 | Crall | B23K 20/129 29/889.23 |
| 6,568,077 B1 | 5/2003 | Hellemann et al. | |
| 6,616,408 B1 * | 9/2003 | Meier | B23P 6/005 416/193 A |
| 6,666,653 B1 | 12/2003 | Carrier | |
| 6,884,975 B2 | 4/2005 | Matsen et al. | |
| 6,933,459 B2 | 8/2005 | Helder et al. | |
| 6,964,557 B2 | 11/2005 | Helder et al. | |
| 7,236,255 B2 | 6/2007 | Kodama et al. | |
| 7,249,412 B2 | 7/2007 | Wayte et al. | |
| 7,334,997 B2 | 2/2008 | Karafillis | |
| 7,358,466 B1 | 4/2008 | Myers et al. | |
| 7,388,466 B2 | 6/2008 | Ghabra et al. | |
| 7,416,393 B2 | 8/2008 | Richter | |
| 7,449,658 B2 | 11/2008 | Mielke | |
| 7,472,478 B2 | 1/2009 | Graham et al. | |
| 7,719,434 B2 | 5/2010 | Murac, Jr. et al. | |
| 7,735,223 B2 | 6/2010 | Clark et al. | |
| 7,782,453 B2 | 8/2010 | Bendall et al. | |
| 7,784,180 B2 * | 8/2010 | Mielke | B23P 6/005 416/223 R |
| 7,797,828 B2 | 9/2010 | Beeson et al. | |
| 7,810,237 B2 | 10/2010 | Lange et al. | |
| 7,825,348 B2 | 11/2010 | Bouet et al. | |
| 7,841,834 B1 | 11/2010 | Ryznic | |
| 7,875,135 B2 | 1/2011 | Kelly et al. | |
| 7,892,370 B2 | 2/2011 | Ott et al. | |
| 8,029,865 B2 | 10/2011 | Mielke | |
| 8,039,773 B2 | 10/2011 | Spallek et al. | |
| 8,049,132 B2 | 11/2011 | Bouet et al. | |
| 8,437,628 B1 | 5/2013 | Lin et al. | |
| 8,516,674 B2 * | 8/2013 | Trewiler | B23K 11/002 29/402.13 |
| 8,578,579 B2 | 11/2013 | Rangarajan et al. | |
| 8,616,852 B2 | 12/2013 | Lin et al. | |
| 8,677,621 B2 | 3/2014 | Haubold et al. | |
| 8,944,772 B2 | 2/2015 | Eberlein et al. | |
| 8,978,249 B2 | 3/2015 | Hovel et al. | |
| 9,018,560 B2 | 4/2015 | Krizansky et al. | |
| 10,029,406 B2 | 7/2018 | Burke et al. | |
| 10,526,902 B2 | 1/2020 | Schloffer et al. | |
| 10,702,961 B2 * | 7/2020 | Gontarski | B25B 5/14 |
| 2003/0066192 A1 | 4/2003 | Wilkins et al. | |
| 2005/0033555 A1 | 2/2005 | Tanner et al. | |
| 2005/0102835 A1 | 5/2005 | Trewiler et al. | |
| 2006/0045785 A1 | 3/2006 | Hu et al. | |
| 2006/0090336 A1 | 5/2006 | Graham et al. | |
| 2006/0236765 A1 | 10/2006 | Bouet et al. | |
| 2006/0239823 A1 | 10/2006 | Mielke et al. | |
| 2006/0277753 A1 | 12/2006 | Ntsama-Etoundi et al. | |
| 2008/0040924 A1 | 2/2008 | Haubold et al. | |
| 2008/0178994 A1 | 7/2008 | Qi et al. | |
| 2008/0182017 A1 | 7/2008 | Singh et al. | |
| 2009/0185908 A1 | 7/2009 | Chung et al. | |
| 2009/0313823 A1 | 12/2009 | Rockstroh et al. | |
| 2010/0095526 A1 | 4/2010 | Derrien et al. | |
| 2010/0170878 A1 | 7/2010 | Krause | |
| 2010/0176097 A1 | 7/2010 | Zhu | |
| 2011/0005075 A1 * | 1/2011 | Trewiler | B23K 11/3081 29/889.1 |
| 2014/0117007 A1 * | 5/2014 | Trapp | H05B 6/02 219/601 |
| 2014/0120483 A1 | 5/2014 | Trapp et al. | |
| 2014/0377075 A1 | 12/2014 | Warikoo et al. | |
| 2016/0023439 A1 | 1/2016 | Zhao et al. | |
| 2018/0015563 A1 | 1/2018 | Yamaashi et al. | |
| 2018/0104763 A1 | 4/2018 | Kodama et al. | |
| 2018/0216464 A1 | 8/2018 | Bezanson et al. | |

FOREIGN PATENT DOCUMENTS

| | | |
|---|---|---|
| EP | 1153699 A2 | 11/2001 |
| EP | 1533071 A2 | 5/2005 |
| EP | 1953263 A2 | 8/2008 |
| EP | 2088212 A1 | 8/2009 |
| EP | 2327505 A2 | 6/2011 |
| EP | 3269490 A1 | 1/2018 |
| FR | 2226241 A1 | 11/1974 |
| WO | 2007095902 | 8/2007 |
| WO | 2014121060 | 8/2014 |
| WO | 2016075391 | 5/2016 |

OTHER PUBLICATIONS

"Apparatus for Solid State Resistance Welding of Airfoils" Published Feb. 13, 2015; Ref. GE259347, 25 pgs. https://priorart.ip.com/IPCOM/000240638/Apparatus-for-solid-state-resistance-welding-of-airfoils.

* cited by examiner

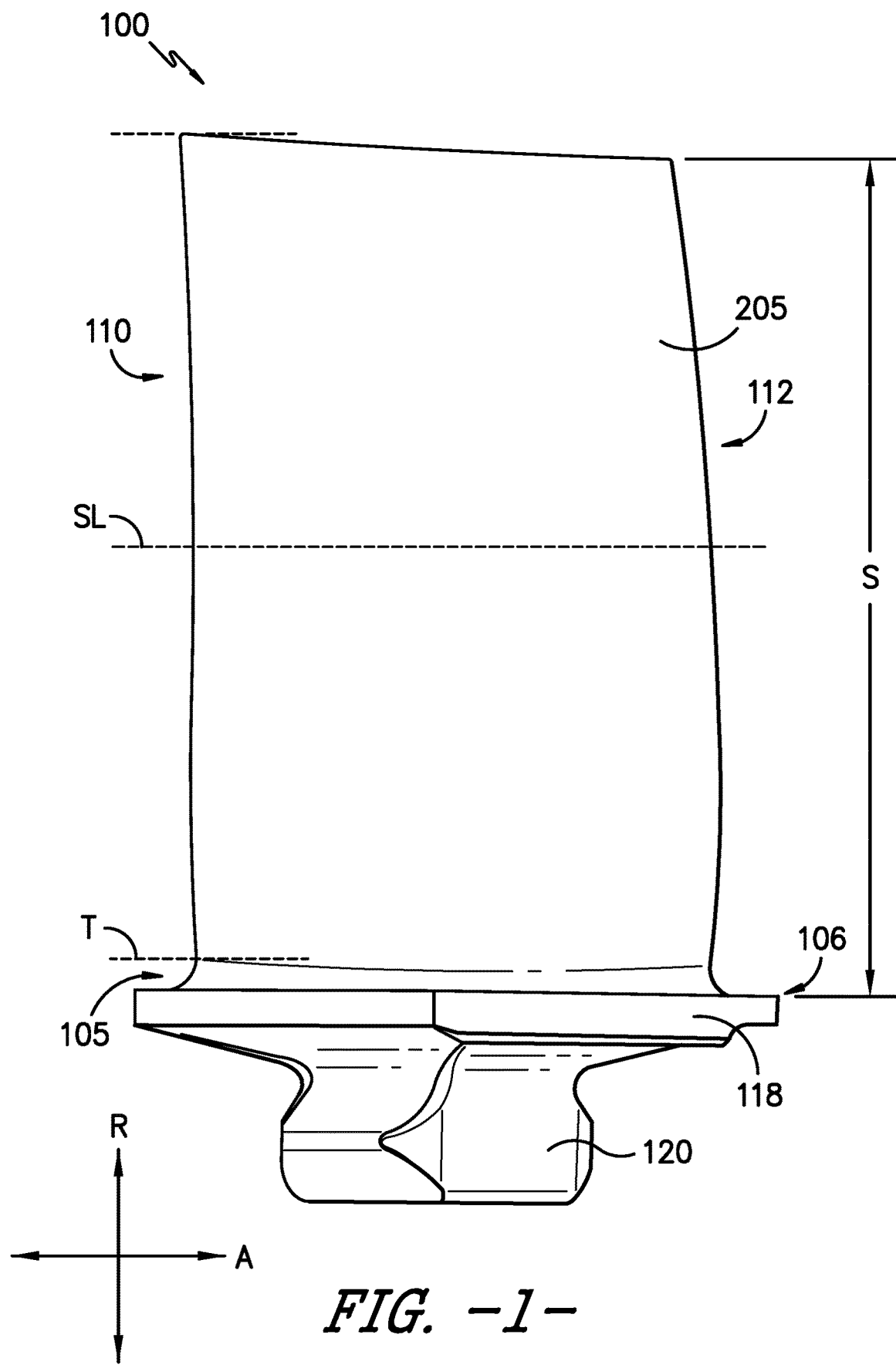
FIG. -1-

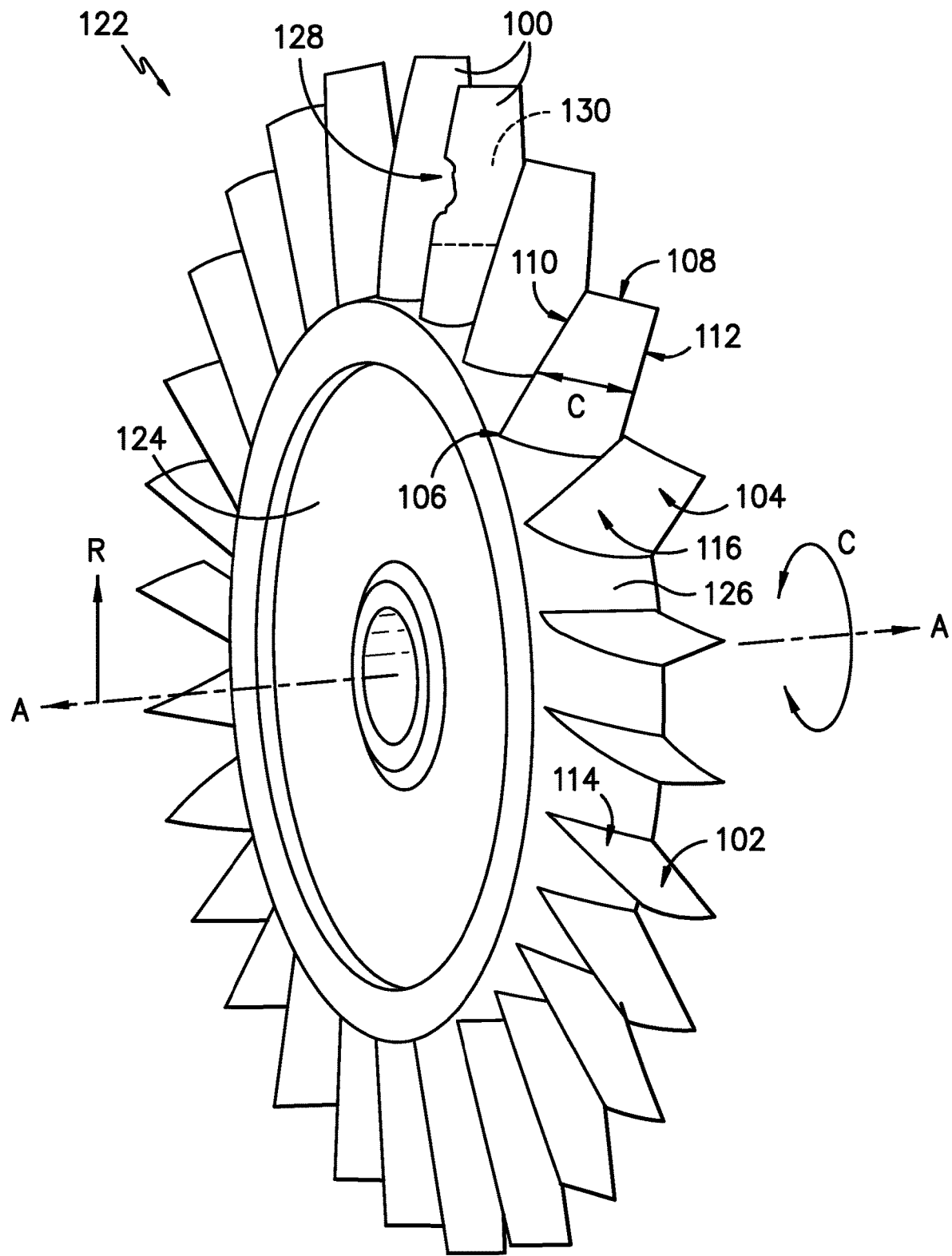
FIG. -2-

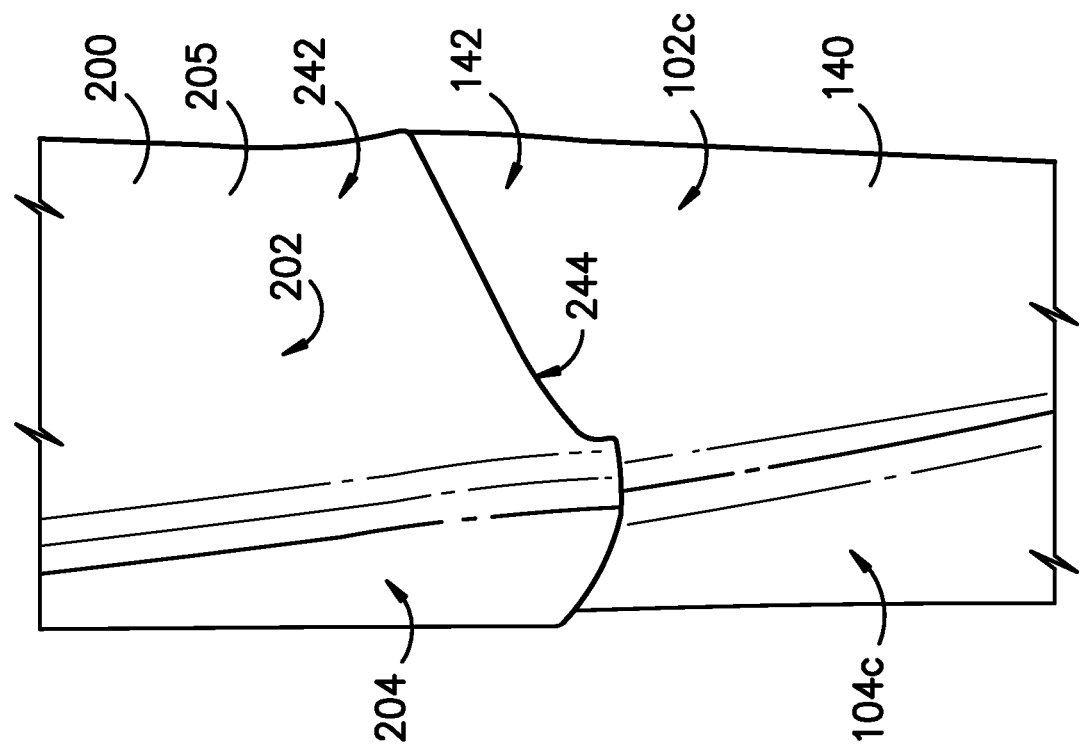
FIG. -3B-
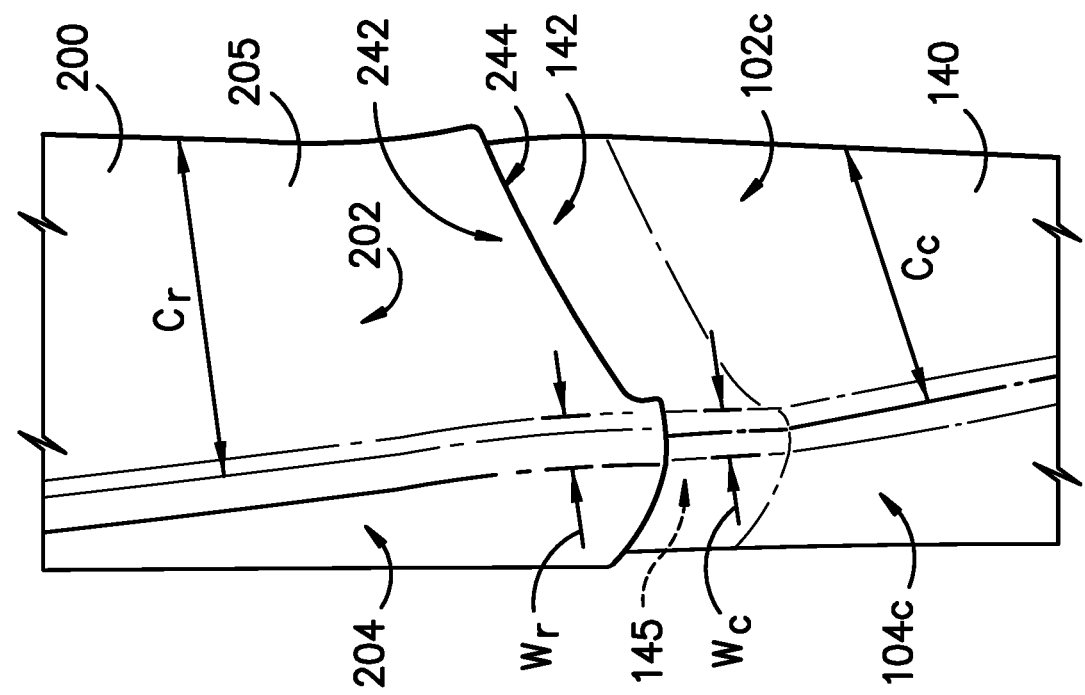
FIG. -3A-

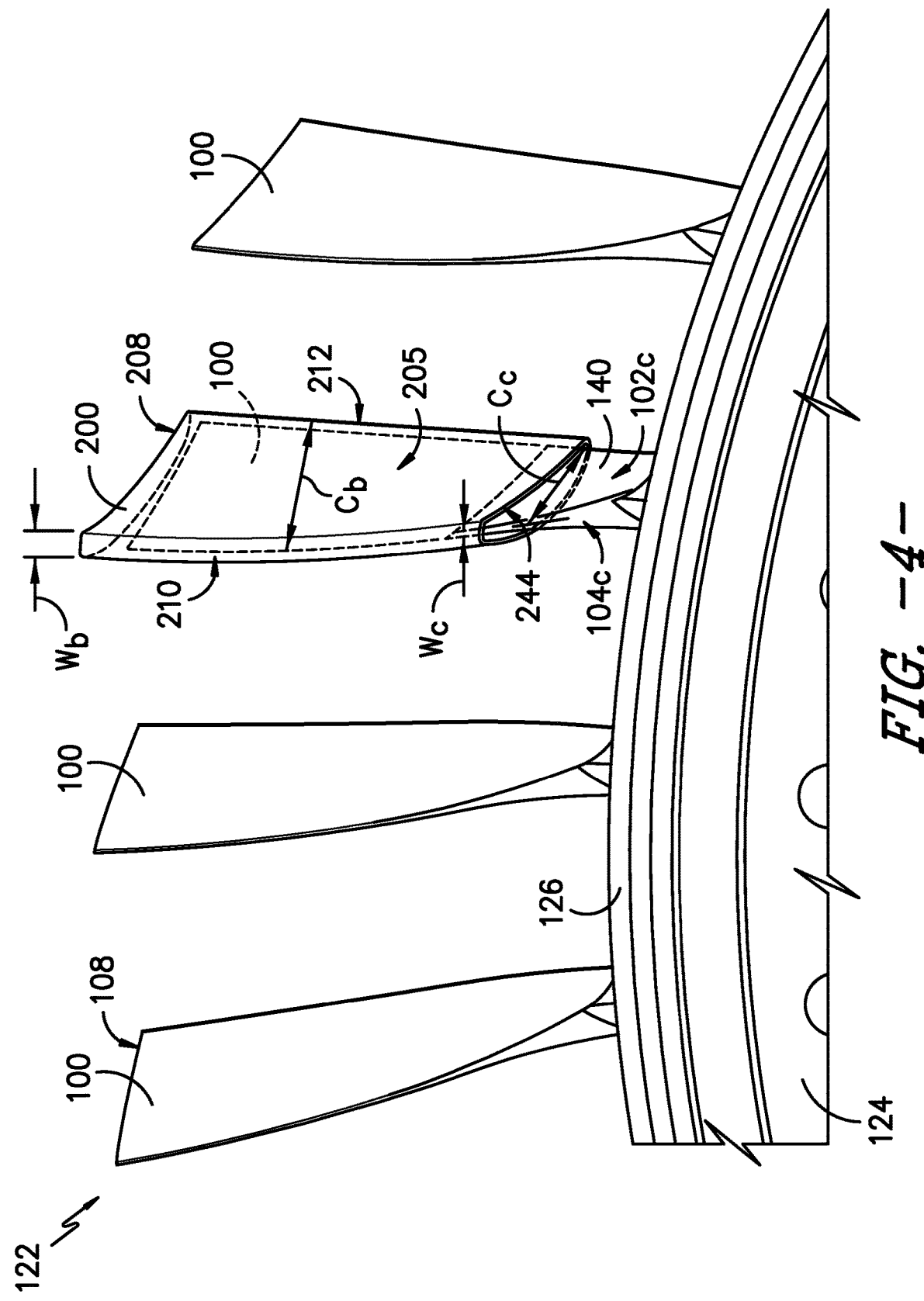

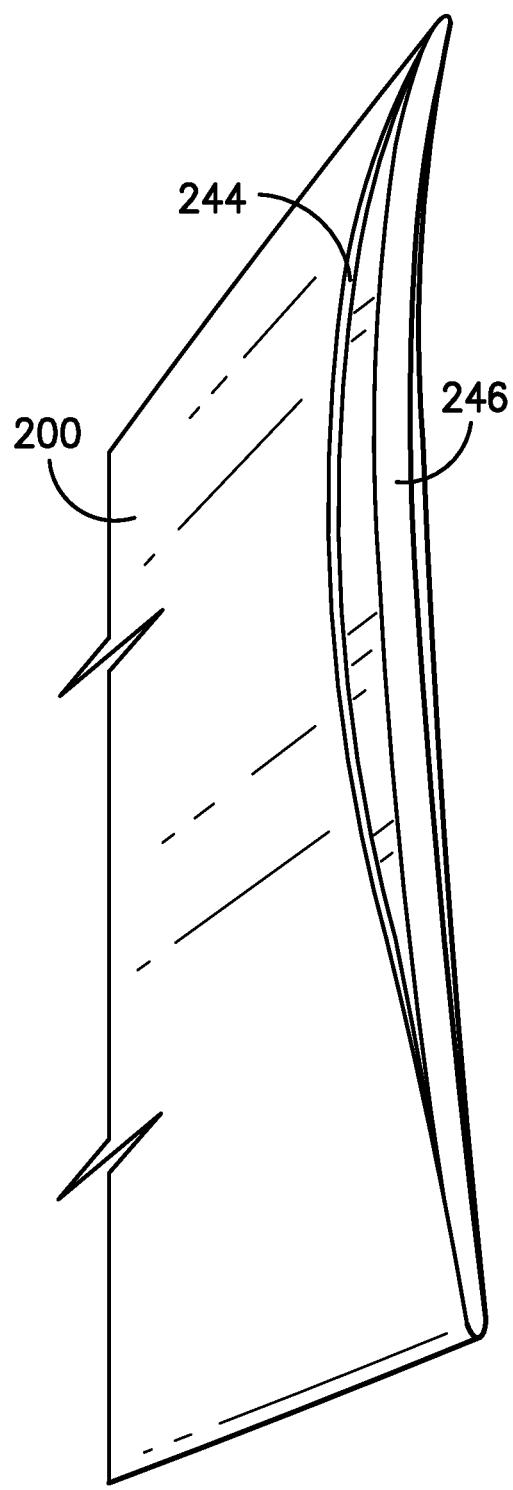
FIG. -5-

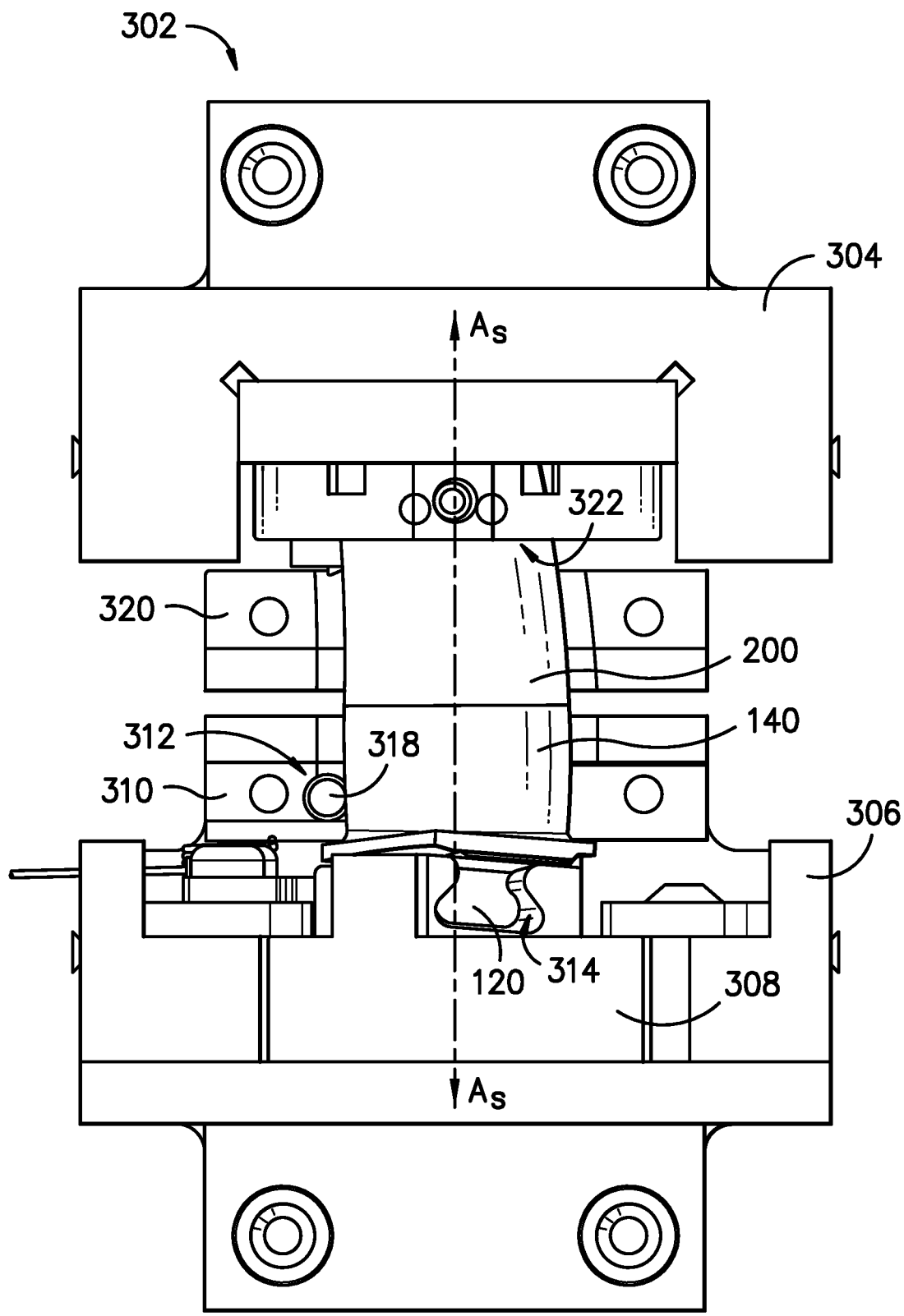
FIG. -6-

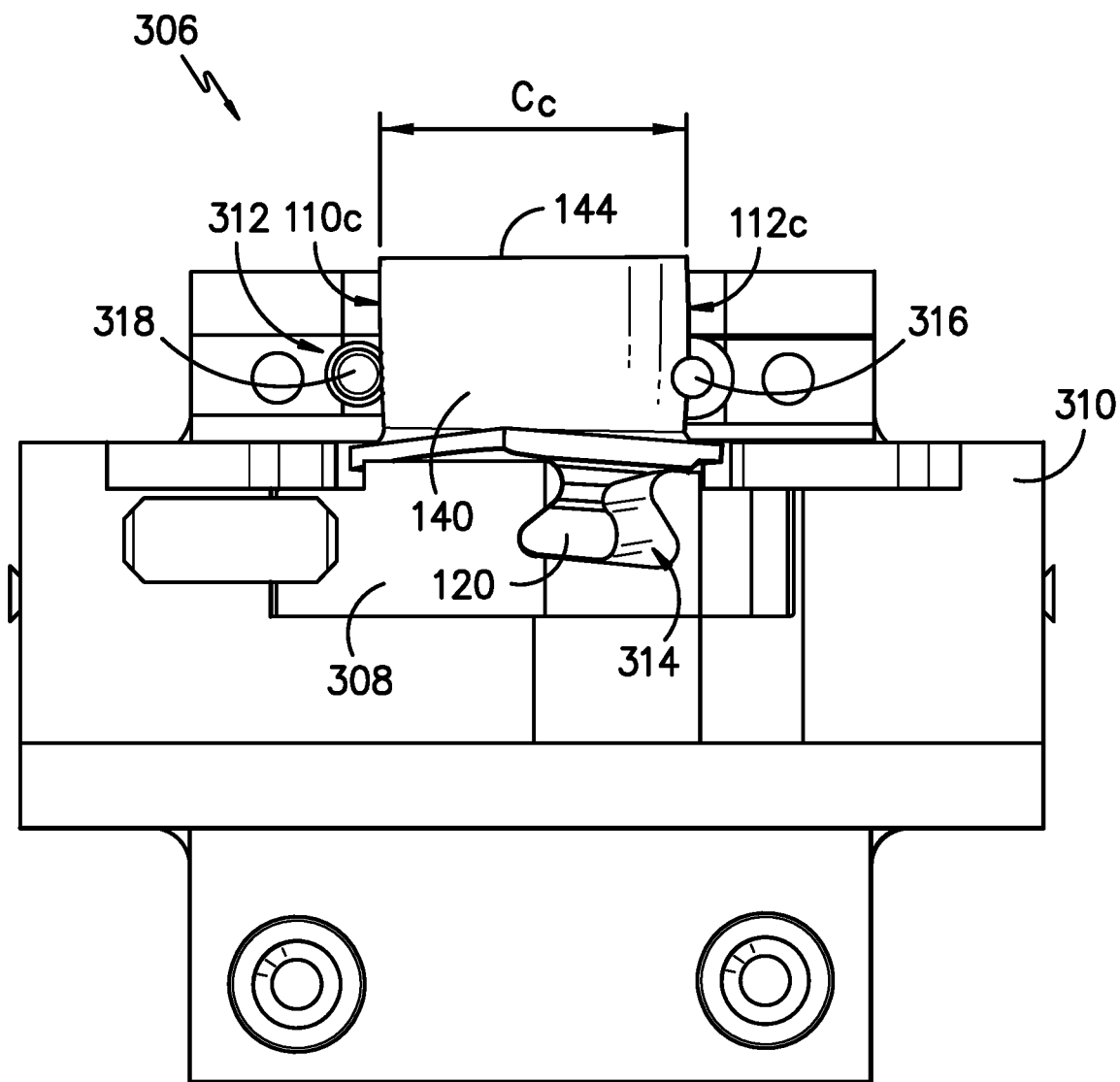
FIG. -7-

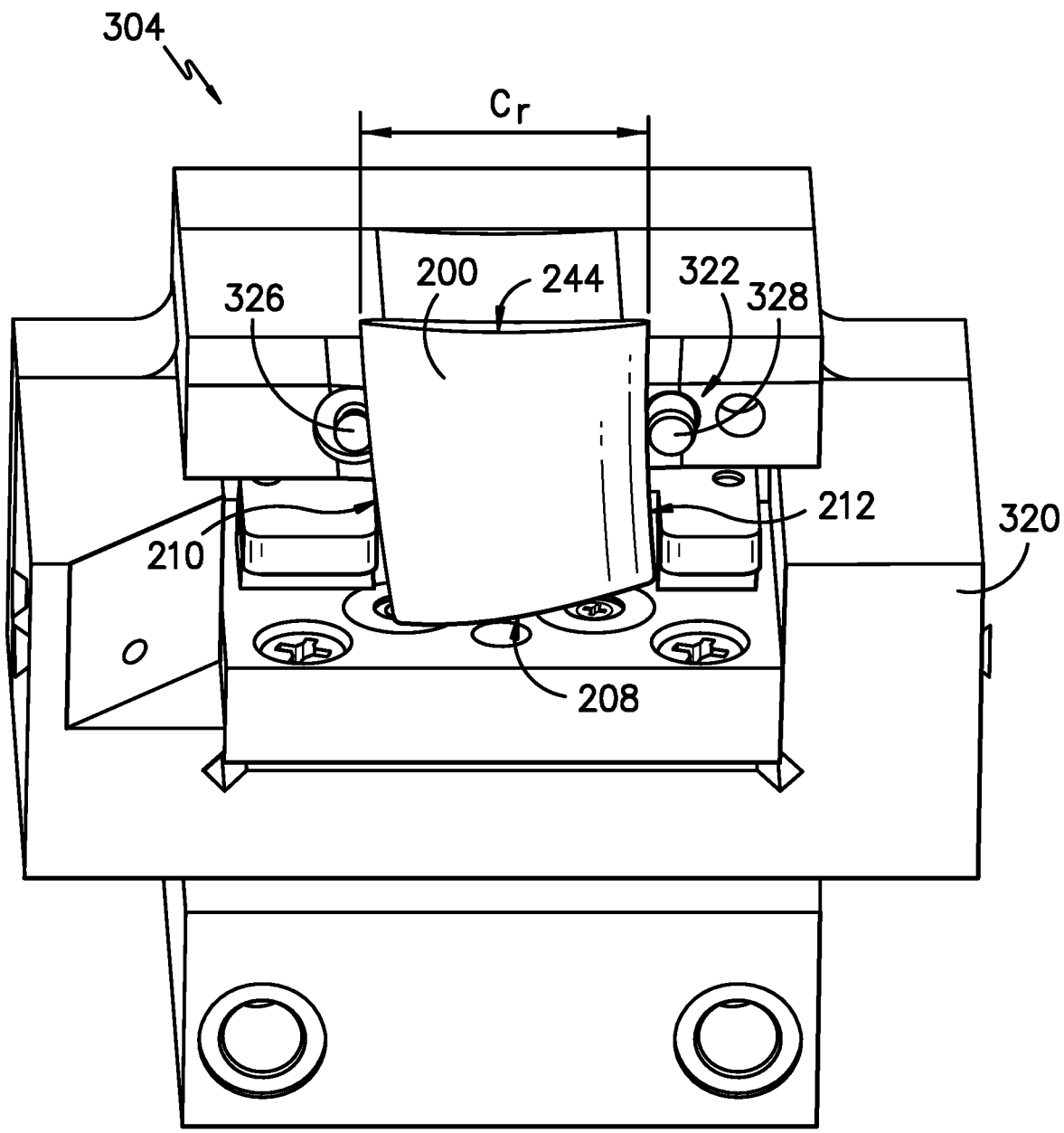
FIG. -8-

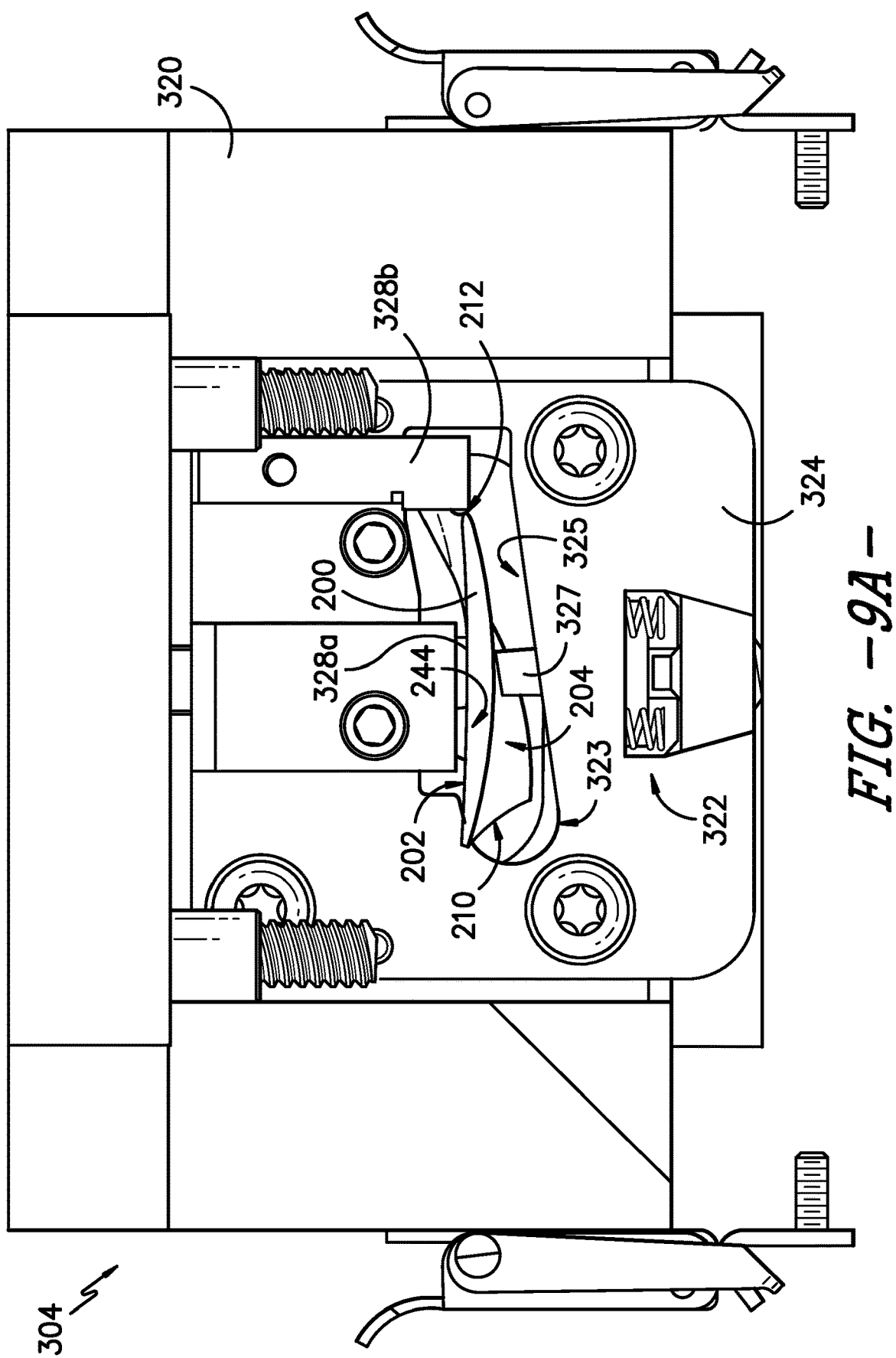
FIG. -9A-

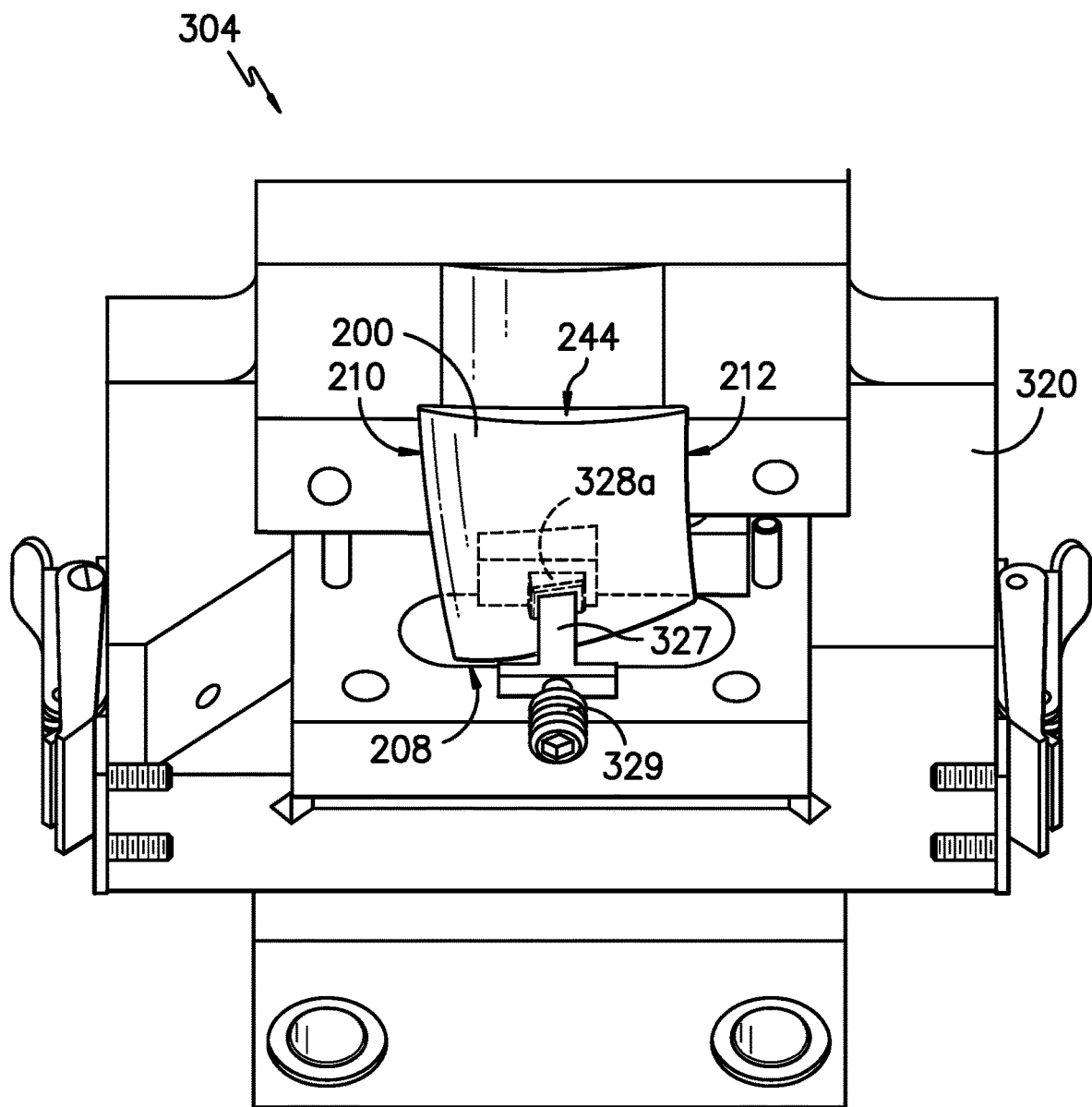
FIG. -9B-

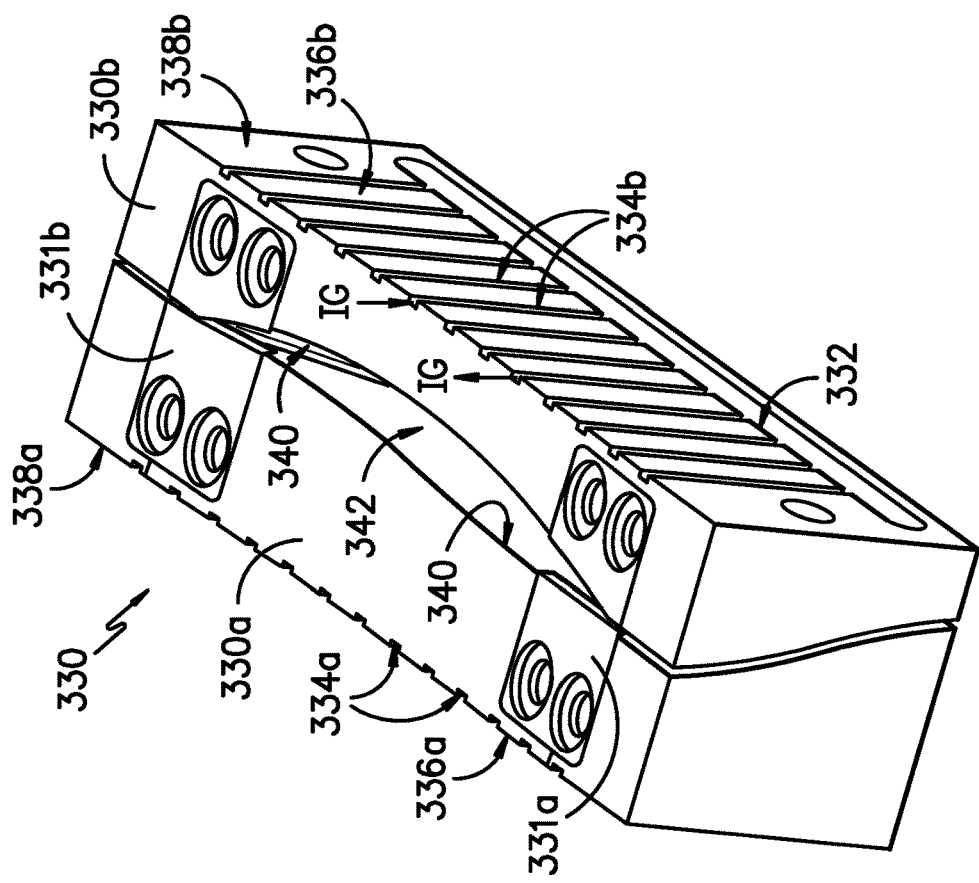
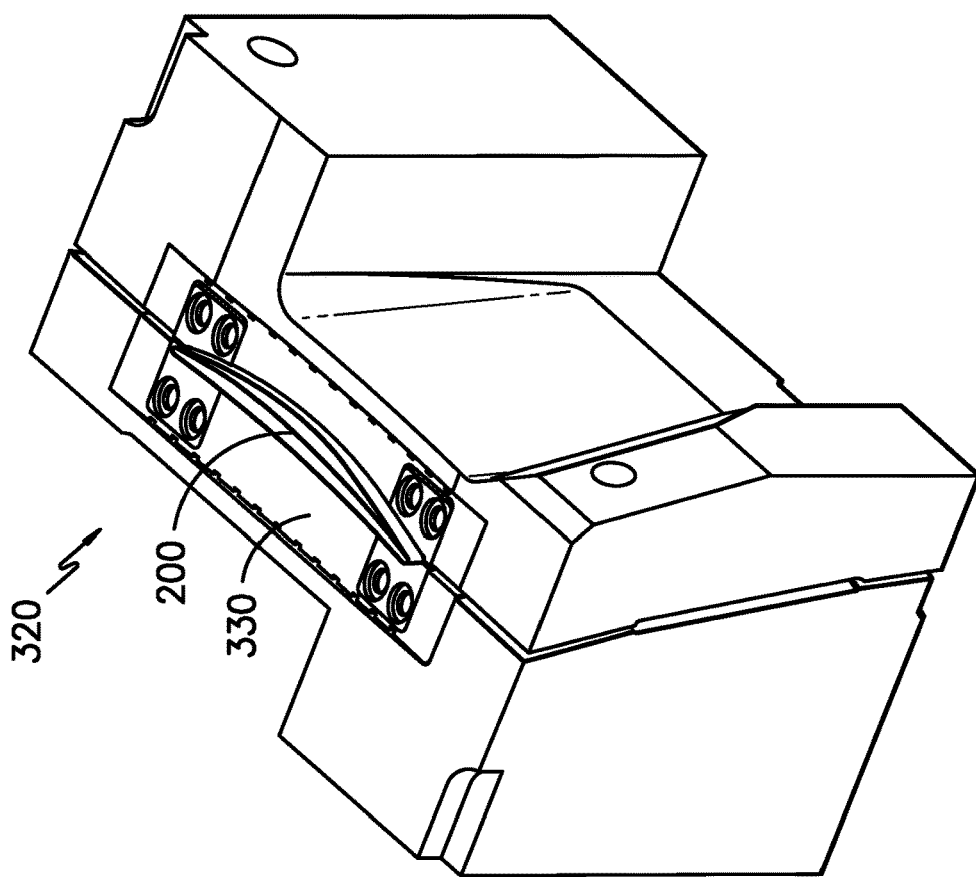

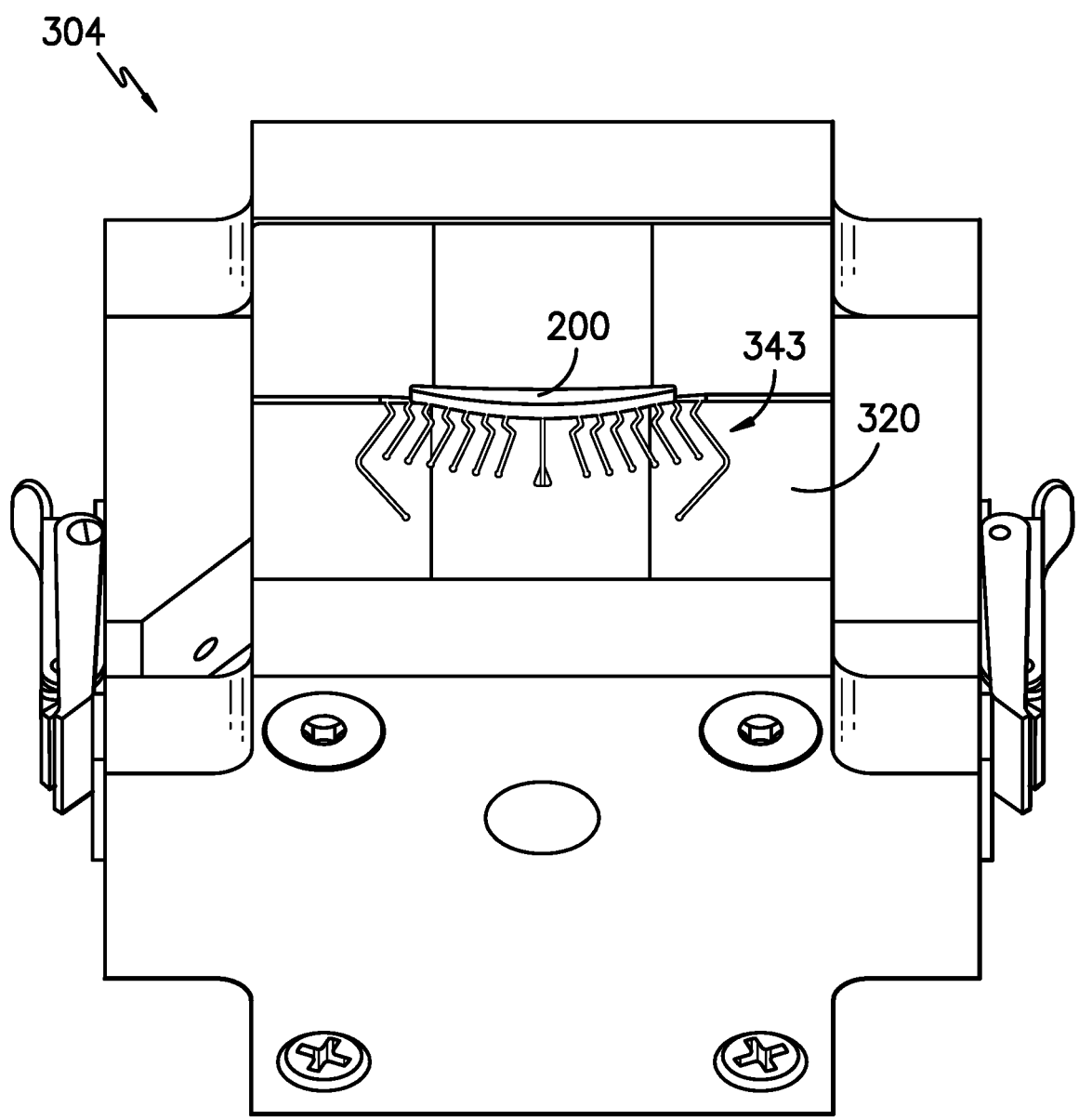
FIG. -10C-

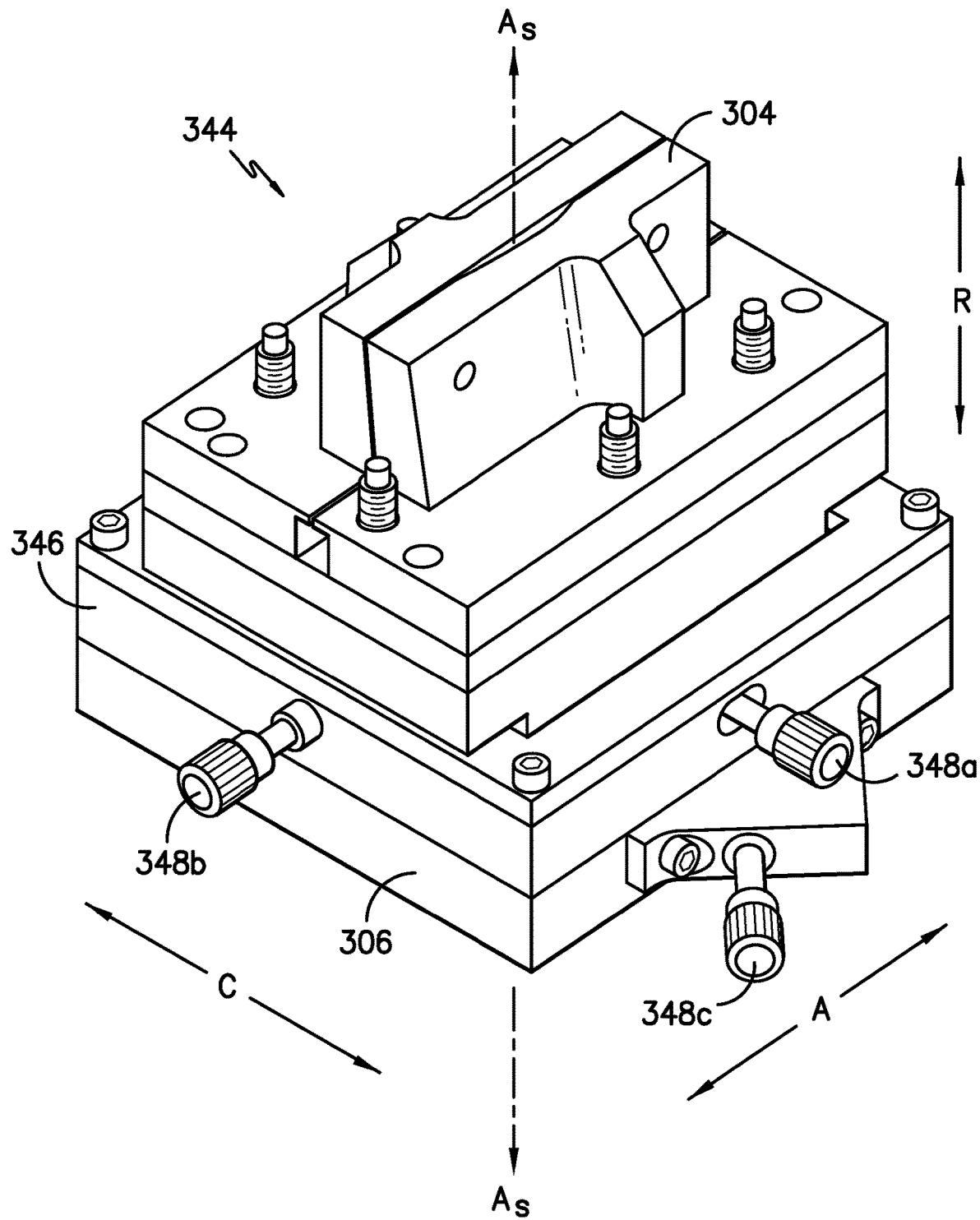
FIG. -11-

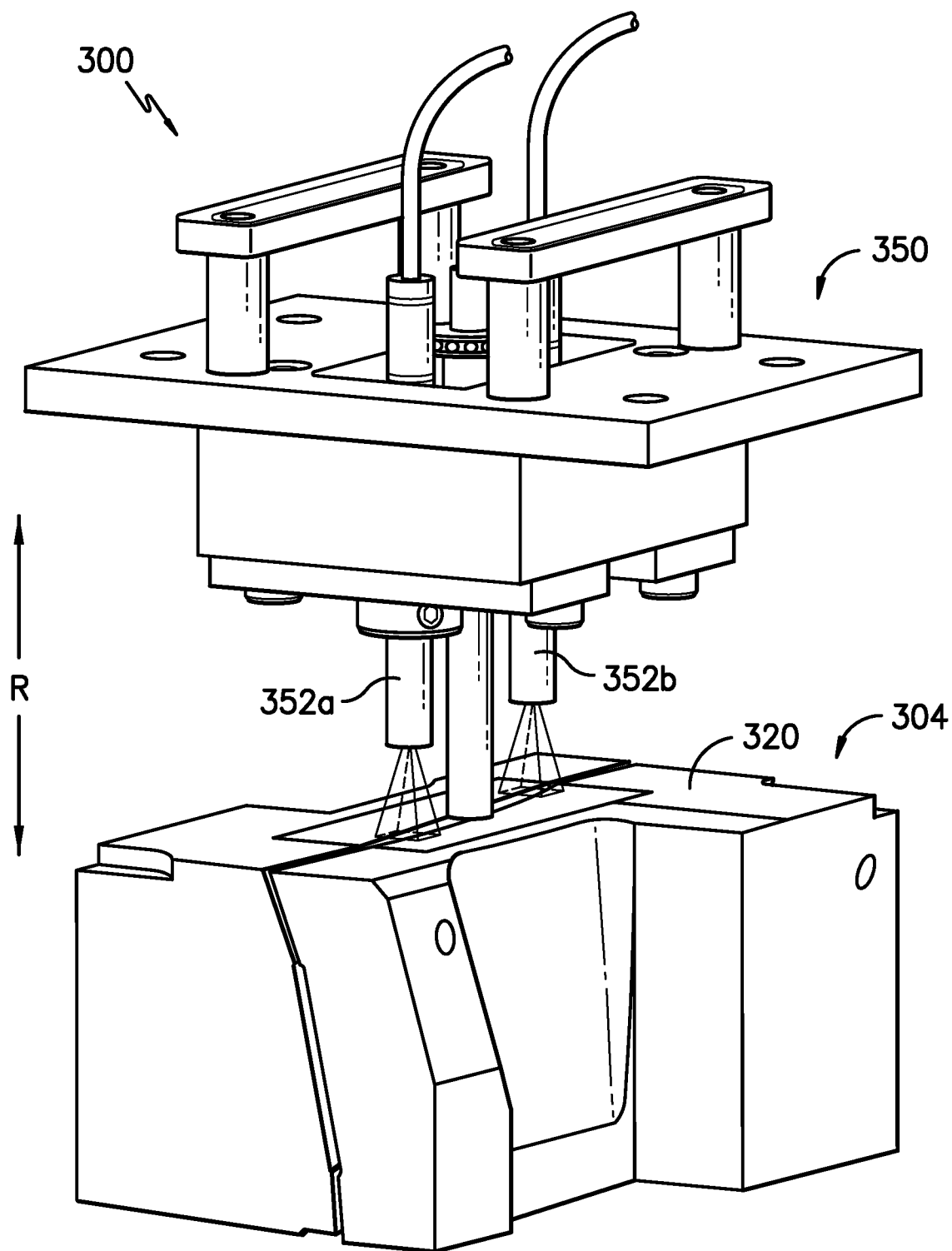
FIG. -12-

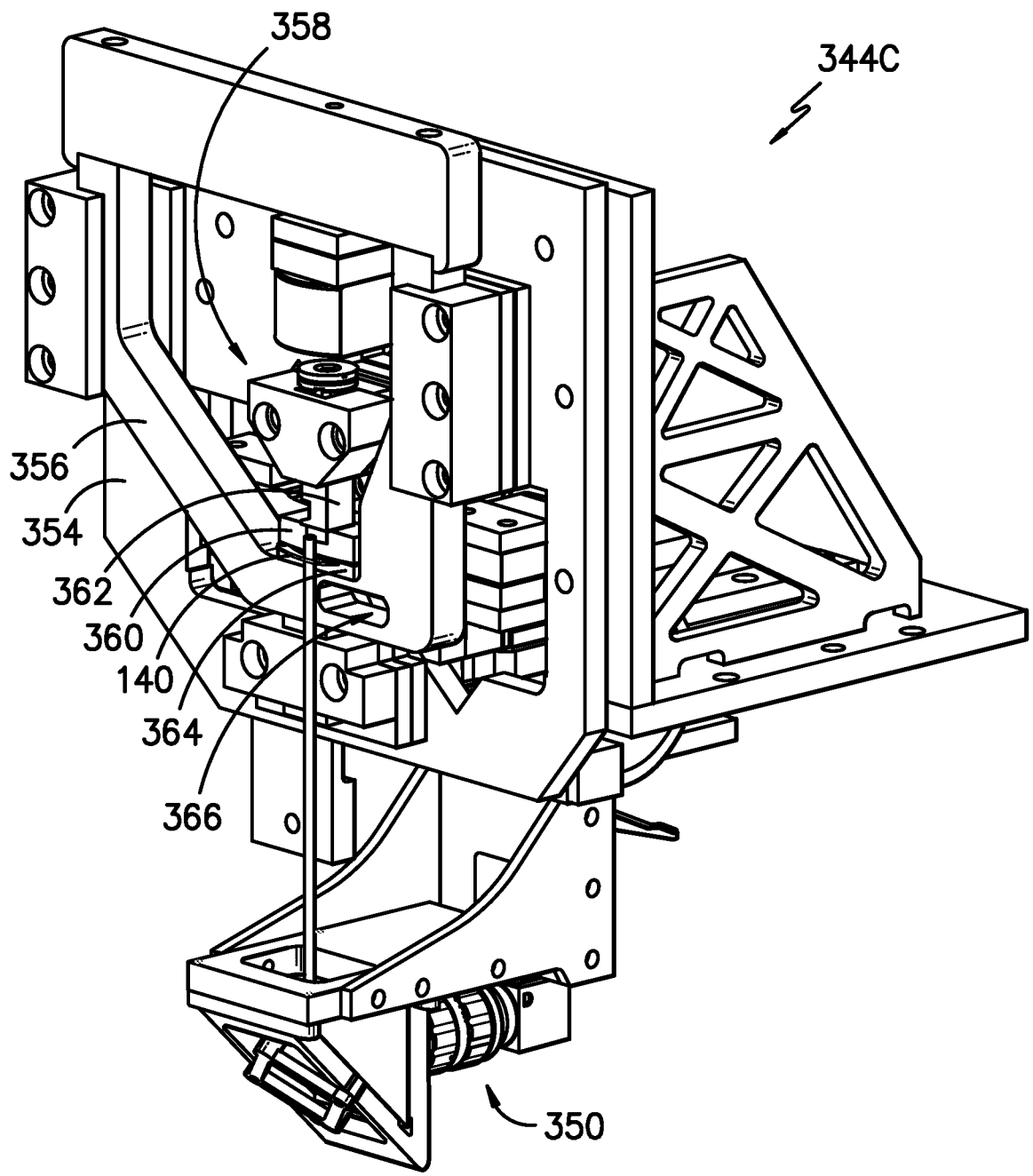
FIG. -13-

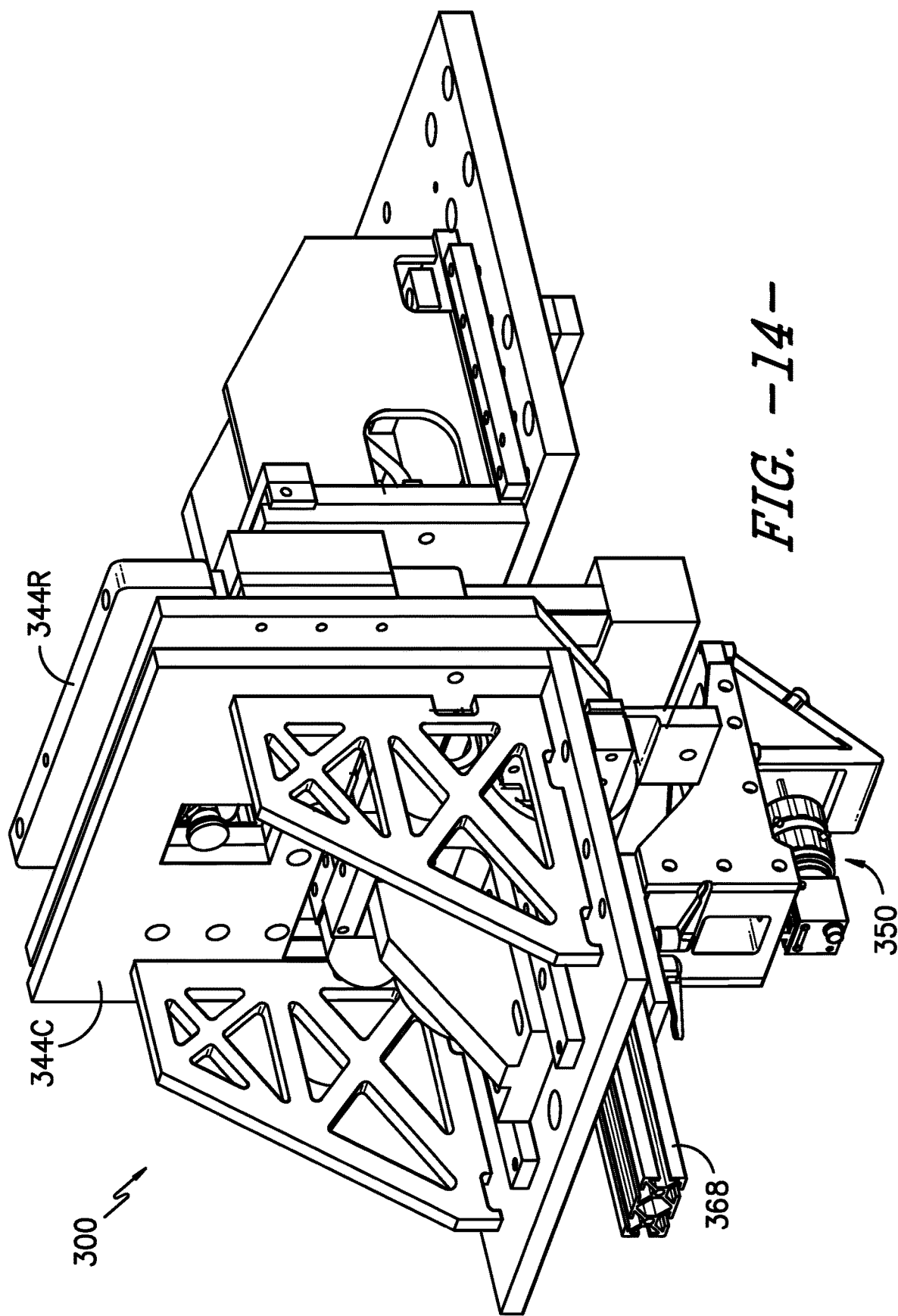
FIG. -14-

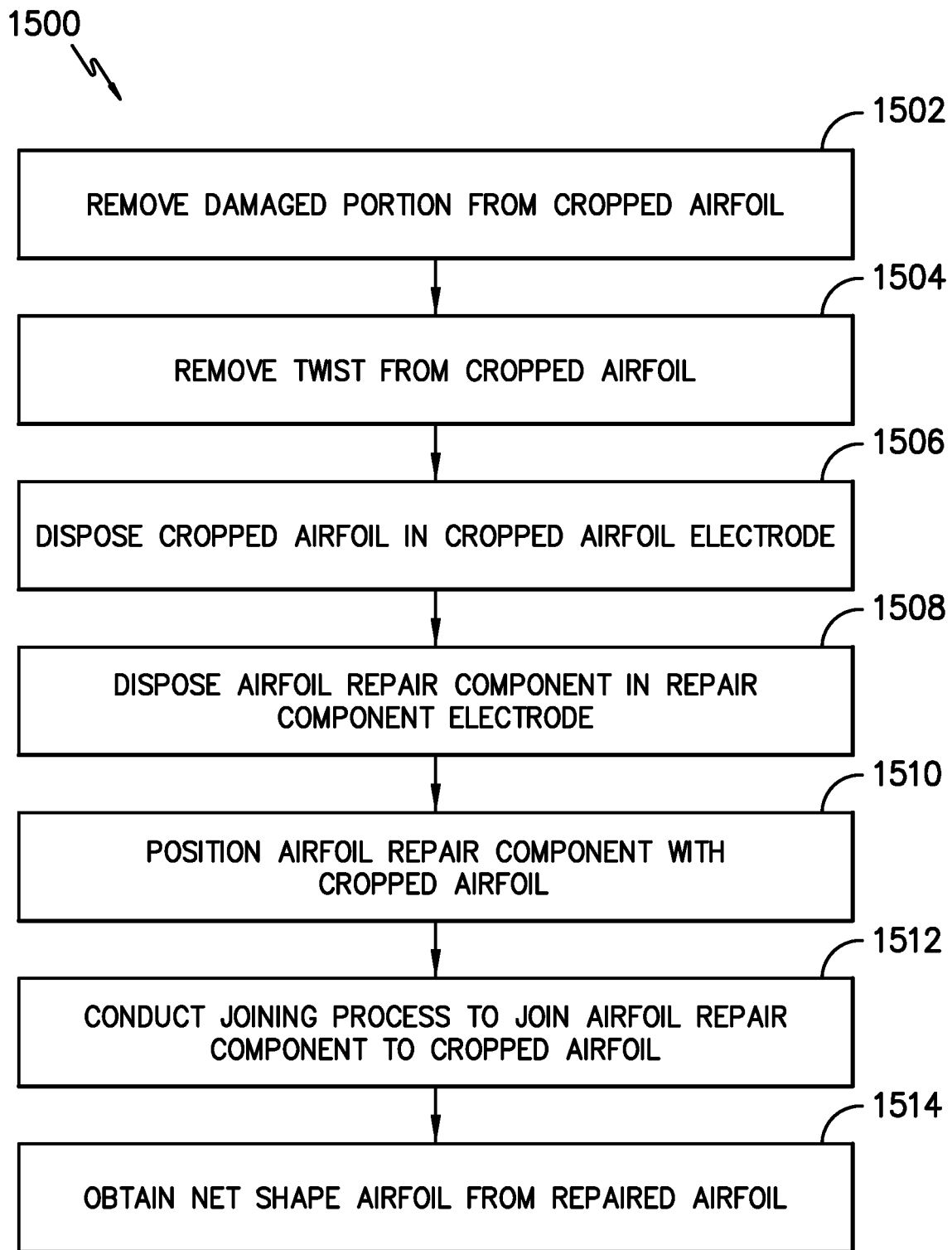
FIG. -15-

AIRFOIL JOINING APPARATUS AND METHODS

FIELD

The present subject matter relates generally to gas turbine engines and, more particularly, to apparatus and methods for joining an airfoil component to a portion of a gas turbine engine airfoil.

BACKGROUND

Typical aircraft propulsion systems include one or more gas turbine engines, which each generally include a turbomachine. The turbomachine includes, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 provides a side schematic view of an airfoil extending radially outward from a platform and a dovetail extending in a radially opposite direction from the airfoil.

FIG. 2 provides a perspective schematic view of a blisk.

FIG. 3A provides a perspective view of a portion of an airfoil repair component positioned against a cropped airfoil.

FIG. 3B provides a perspective view of a portion of an airfoil repair component positioned against a cropped airfoil.

FIG. 4 provides a perspective view of a portion of a blisk with an airfoil repair component positioned against a cropped airfoil.

FIG. 5 provides a perspective view of an airfoil repair component having a projection on an airfoil joining face thereof.

FIG. 6 provides a side cross-section view of an electrode assembly of an airfoil repair system.

FIG. 7 provides a side cross-section view of a cropped airfoil electrode of an electrode assembly of an airfoil repair system.

FIG. 8 provides a side cross-section view of a repair component electrode of an electrode assembly of an airfoil repair system.

FIG. 9A provides a top view of a repair component electrode of an electrode assembly of an airfoil repair system.

FIG. 9B provides a perspective view of a portion of the repair component electrode of FIG. 9A.

FIG. 10A provides a side perspective view of a repair component electrode body of a repair component electrode.

FIG. 10B provides a side perspective view of a repair component electrode insert of a repair component electrode.

FIG. 10C provides an end perspective view of a repair component electrode.

FIG. 11 provides a perspective view of an electrode assembly of an airfoil repair system having an alignment assembly.

FIG. 12 provides a perspective view of a feedback assembly of a tooling assembly of an airfoil repair system.

FIG. 13 provides a side perspective view of an airfoil portion of a tooling assembly of an airfoil repair system for a blisk.

FIG. 14 provides a side perspective view of a tooling assembly of an airfoil repair system for a blisk.

FIG. 15 provides a flow diagram illustrating a method for repairing an airfoil.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A typical compressor has multiple stages or rows of rotor blades and corresponding stator vanes that sequentially increase the pressure of the air as it flows in an axial downstream direction. In some compressors, the compressor blades include dovetails for being removably mounted in a corresponding dovetail slot in the perimeter of a rotor disk. The dovetail-to-dovetail slot configuration permits the individual manufacture of each blade, and the individual replacement thereof in the event of blade damage during operation. However, it can be expensive to completely replace damaged blades, particularly when the damage is located near the tip of the blade such that a majority of the blade and the dovetail remains intact and undamaged.

In other compressors, the compressor blades may be provided as a bladed disk, also referred to as a blisk. A blisk includes a row of rotor airfoils integrally formed with the perimeter of a rotor disk in a one-piece or unitary configuration. As such, unlike the removably mounted blades described above, in the event of a damaged blisk airfoil, either the entire blisk must be replaced or the damaged airfoil must be removed and replaced without damaging adjacent airfoils, which could be expensive and/or complicated. Other airfoils within a turbomachine, for example in the fan and turbine section, also may have either a dovetail configuration or be part of a blisk and face similar drawbacks or limitations as described above.

Accordingly, improved airfoil repair and airfoil handling methods and apparatus would be desirable.

Generally, the present subject matter provides methods and apparatus for airfoil repairs. For instance, the present subject matter provides methods and apparatus for removing a damaged portion of an airfoil to form a cropped airfoil and joining an airfoil repair component to the cropped airfoil to repair the airfoil. Such airfoil repairs can be time-consuming and/or expensive, while often also having low yield rates, but the methods and apparatus described herein can improve success and yield while reducing repair time and costs for repair of individual airfoils, e.g., airfoils secured to a disk via a dovetail, and/or integral airfoils, e.g., blisk airfoils that are integrally formed with a disk. For example, an airfoil repair component includes a repair attachment section for attaching the airfoil repair component to the cropped airfoil at a cropped airfoil attachment section. In at least some embodiments, the repair attachment section is oversized with respect to the cropped airfoil attachment section such that the repair attachment section has a repair chord length longer than a cropped chord length of the cropped airfoil attachment section and a repair width wider than a cropped width of the cropped airfoil attachment section. A locally or wholly oversized airfoil repair component can improve the chances of proper alignment between the airfoil repair component and the cropped airfoil (i.e., an airfoil with a damaged portion removed), with increased material margin or stock for post-joining processing to achieve the net shape of the original airfoil. Further, the present subject matter provides an electrode assembly comprising a repair component electrode and a cropped airfoil electrode, which surround the airfoil repair component and the cropped airfoil, respectively, and are positioned to align the airfoil repair component with the cropped airfoil such that when a current is passed therethrough under an applied force, the airfoil repair component is attached to the cropped airfoil. For instance, the present subject matter provides methods and apparatus for securing the airfoil repair component and/or the cropped airfoil within an electrode to eliminate over constraint and permit more accurate positioning of the airfoil repair component and/or cropped airfoil, while also reducing or eliminating hand tools in loading and unloading components from their respective electrodes, e.g., by using spring loaded design features and other easily hand-manipulated design features. Moreover, the present subject matter provides features for process feedback, environmental shielding, and/or stabilization that can produce higher quality welds or joints between the airfoil repair component and the cropped airfoil, better and/or faster alignment of the airfoil repair component with respect to the cropped airfoil, and/or easier post-joining extraction of the repaired airfoil.

Referring now to the drawings, wherein identical numerals indicate the same elements throughout the figures, FIG. 1 is a schematic view of an airfoil 100, e.g., an airfoil of a gas turbine engine. FIG. 2 is a schematic view of a bladed disk 122, also known as a blisk, having a plurality of airfoils 100 integrally formed with a rotor disk, such as may be used in a gas turbine engine. In at least some embodiments, the gas turbine engine may be a turbofan jet engine including a fan section and a core turbine engine disposed downstream from the fan section. The core turbine engine generally includes a substantially tubular outer casing that encases, in serial flow relationship, a compressor section including a booster or low pressure (LP) compressor and a high pressure (HP) compressor; a combustion section; a turbine section including a high pressure (HP) turbine and a low pressure (LP) turbine; and a jet exhaust nozzle section. A high pressure (HP) shaft or spool drivingly connects the HP turbine to the HP compressor. A low pressure (LP) shaft or spool drivingly connects the LP turbine to the LP compressor. During operation of the turbofan jet engine, a volume of air passes across fan blades of a fan disposed in the fan section. A first portion of the air is directed or routed into a bypass airflow passage and a second portion of the air is directed or routed into the LP compressor. The ratio between the first portion of air and the second portion of air is commonly known as a bypass ratio.

The pressure of the second portion of air is increased as it is routed through the high pressure (HP) compressor and into the combustion section, where it is mixed with fuel and burned to provide combustion gases. The combustion gases are routed through the HP turbine where a portion of thermal and/or kinetic energy from the combustion gases is extracted via sequential stages of HP turbine stator vanes that are coupled to the outer casing of the core turbine engine and HP turbine rotor blades that are coupled to the HP shaft or spool, thus causing the HP shaft or spool to rotate, thereby supporting operation of the HP compressor. The combustion gases are then routed through the LP turbine, where a second portion of thermal and kinetic energy is extracted from the combustion gases via sequential stages of LP turbine stator vanes that are coupled to the outer casing of the core turbine engine and LP turbine rotor blades that are coupled to the LP shaft or spool, thus causing the LP shaft or spool to rotate, thereby supporting operation of the LP compressor and/or rotation of the fan. The combustion gases are subsequently routed through the jet exhaust nozzle section of the core turbine engine to provide propulsive thrust.

Simultaneously, the pressure of the first portion of air is substantially increased as the first portion of air is routed through the bypass airflow passage before it is exhausted from a fan nozzle exhaust section, also providing propulsive thrust. The HP turbine, the LP turbine, and the jet exhaust nozzle section at least partially define a hot gas path for routing the combustion gases through the core turbine engine.

In some embodiments, the airfoil 100 depicted in FIGS. 1 and 2 may be a compressor blade, such as a rotor blade of the LP compressor or the HP compressor of the turbofan jet engine described above. In other embodiments, the airfoil 100 depicted in FIGS. 1 and 2 may be a turbine blade, such as a rotor blade of the LP turbine or the HP turbine of the turbofan jet engine. In still other embodiments, the airfoil 100 may be another airfoil of the turbofan jet engine described above, of another gas turbine engine, or of another assembly or system having one or more airfoils.

As shown in the depicted embodiments of FIGS. 1 and 2, the airfoil 100 includes a concave pressure side 102 opposite a convex suction side 104. Opposite pressure side 102 and suction side 104 of the airfoil 100 extend radially along a span S from a root 106 to a tip 108 at the radially outermost portion of the airfoil 100. That is, the root 106 defines a first radial extremity of the airfoil 100, and the tip 108 defines a second radial extremity of the airfoil 100, with the root 106 and the tip 108 spaced apart along a radial direction R. The pressure side 102 and the suction side 104 of the airfoil 100 extend axially along a chord length c between a leading edge 110 and an opposite trailing edge 112. The leading edge 110 defines a forward end of the airfoil 100, and the trailing edge 112 defines an aft end of the airfoil 100, with the leading edge 110 and the trailing edge 112 spaced apart along an axial direction A. Further, the pressure side 102 defines an outer pressure surface 114 of the airfoil 100, and the suction side 104 defines an outer suction surface 116 of the airfoil 100.

More generally, the airfoil 100 may be described as having a first side opposite a second side, with either of the first side and the second side being the pressure side 102 or the suction side 104 and the other of the first and second sides being the other of the pressure side 102 and the suction side 104. Each of the first side and the second side extend axially between a first edge and an opposite second edge, with either of the first edge and the second edge being the leading edge 110 or the trailing edge 112 and the other of the first and second edges being the other of the leading edge 110 and the trailing edge 112. Further, the first side defines a first outer surface of the airfoil 100, and the second side defines a second outer surface of the airfoil 100, with either of the first outer surface and the second outer surface being the outer pressure surface 114 or the outer suction surface 116 and the other of the first and second outer surfaces being the other of the outer pressure surface 114 and the outer suction surface 116.

In the embodiment of FIG. 1, the airfoil 100 extends radially outward from a platform 118. A dovetail 120 extends from the platform 118 in a radially opposite direction from the airfoil 100. The dovetail 120 is configured to be received within a complementarily shaped dovetail slot in a rotor disk (not shown). In the depicted embodiment, the airfoil 100, the platform 118, and the dovetail 120 are secured to one another, or integrally formed as a single piece or component, such that the airfoil 100, platform 118, and dovetail 120 together are removably received in the rotor disk. It will be appreciated that a plurality of airfoils 100 are secured to the rotor disk via a corresponding number of dovetails 120 to form a stage of rotor blades, e.g., a stage of compressor blades of a gas turbine engine compressor. The plurality of airfoils 100 are circumferentially spaced apart from one another, or spaced apart along a circumferential direction C, to define a ring of airfoils 100, similar to the airfoils 100 of the blisk 122 shown in FIG. 2.

As further illustrated in FIG. 1, a fillet 105 defines a transition between the pressure side 102 and the platform 118, as well as the suction side 104 and the platform 118. Moreover, the airfoil 100 defines a section line SL, e.g., at one half of the distance between the tip 108 at the leading edge 110, and a leading edge fillet tangency taken at the fillet 105 between the leading edge 110 and the platform 118.

As previously stated, FIG. 2 depicts a bladed disk or blisk 122 that has multiple airfoils 100 extending from a rotor disk 124 at an integral platform 126. It will be appreciated that the airfoils 100 of the blisk 122 are configured as described with respect to FIG. 1. However, rather than a separate platform 118 and dovetail 120 for each airfoil 100 as in the embodiment of FIG. 1, the blisk 122 comprises a single platform 126 that serves as a platform for each of the multiple airfoils 100. Further, no dovetails 120 are necessary in the embodiment of FIG. 2 because the airfoils 100 are integrally formed with the rotor disk 124. As such, while the airfoils 100 of FIG. 1 are removable from the described rotor disk, the airfoils 100 of FIG. 2 are not removable with respect to the rotor disk 124 but, instead, are integrally formed with the platform 126 and rotor disk 124 to form the blisk 122.

From time to time, an airfoil 100 may become damaged during use. For instance, the airfoil 100 may experience localized damage during service, e.g., through inadvertent tip rub against a shroud or casing, impingement by a foreign object, and/or other contact between the airfoil 100 and another component, object, or substance. The airfoil 100 may develop a damaged area 128, such as illustrated on an airfoil 100 of the blisk 122 shown in FIG. 2, which may be, e.g., a cavity. As used herein, the term "cavity" refers to any hollow space within the airfoil 100, such as an opening, crack, gap, aperture, hole, etc. Such a cavity or damaged area 128 can be formed on or in the airfoil 100 through normal use and generally represents an area where fragments, chunks, pieces, etc. of the original airfoil material have broken off or been liberated from the airfoil 100.

In at least some instances, the damaged area 128 hinders the functionality of the airfoil 100 such that the airfoil 100 should be repaired. Generally, the airfoil 100 could be repaired by replacing the entire airfoil 100 or through removal and replacement of a portion 130 of the airfoil 100 containing the damaged area 128, which is referred to herein as the damaged portion 130. In some embodiments, the damaged portion 130 may be removed along a plane below or radially inward with respect to the section line SL (FIG. 1), such that more than half of the airfoil 100 is removed. In other embodiments, the damaged portion 130 may be removed along a plane above or radially outward with respect to the section line SL, such that less than half of the airfoil 100 is removed.

It will be appreciated that replacement of the entire airfoil 100 generally is more expensive than replacing only the damaged portion 130 of the airfoil 100. Further, at least for the blisk 122, replacing the entire airfoil 100 generally involves a complicated manufacturing process and could risk damaging the platform 126 and/or rotor disk 124 of the blisk 122, as well as adjacent, undamaged airfoils 100. Other complications of replacing the entire airfoil 100 may be realized as well.

Accordingly, to minimize replacement costs and manage complexity, the present subject matter provides methods, components, systems, and apparatus for replacing only the damaged portion 130. For example, turning to FIGS. 3A, 3B, and 4, an airfoil component or airfoil repair component 200 to replace the damaged portion 130 is provided. As described in greater detail herein, the damaged portion 130 is removed from the airfoil 100 (e.g., above, below, or at the section line SL shown in FIG. 1) to form a cropped airfoil 140, such that the cropped airfoil 140 has a radial height less than the span S of the airfoil 100 (FIG. 1). The cropped airfoil 140 comprises the airfoil root 106 and, thus, remains secured (or can be re-secured) to the platform 118 and dovetail 120 of the individual airfoils 100 described with respect to FIG. 1, or remains integral with the rotor disk 124 and platform 126 of the blisk 122 of FIG. 2. Further, the cropped airfoil 140 comprises the remaining portions of the pressure side 102, suction side 104, leading edge 110, and trailing edge 112, which are referred to herein as the cropped pressure side 102c, the cropped suction side 104c (FIGS. 3A, 3B), the cropped leading edge 110c (FIG. 7), and the cropped trailing edge 112c (FIG. 7).

Like the airfoil 100, the cropped airfoil 140 may have features that more generally be described as a cropped first side and an opposite cropped second side, which are either of the cropped pressure side 102c or the cropped suction side 104c. Each of the cropped first side and the cropped second side extend axially between a cropped first edge and an opposite cropped second edge, which are either of the cropped leading edge 110c or the cropped trailing edge 112c.

Referring to FIG. 4, because the airfoil repair component 200 attaches to the cropped airfoil 140 to yield a repaired airfoil 100, the airfoil repair component 200 is configured similar to the airfoil 100 described with respect to FIGS. 1 and 2. More particularly, referring to FIGS. 3A, 3B, and 4, the airfoil repair component 200 comprises a body 205 having a repair pressure side 202 opposite a repair suction side 204, and a repair leading edge 210 opposite a repair trailing edge 212. Further, the repair pressure side 202 and the repair suction side 204 extend axially between the repair leading edge 210 and the repair trailing edge 212. More generally, the airfoil repair component 200 comprises a body 205 having a first side opposite a second side, with the first and second sides being either of the repair pressure side 202 and the repair suction side 204, and the first and second sides extend axially between a first edge and a second edge, with the first and second edges being either of the repair leading edge 210 and the repair trailing edge 212. Like the cropped airfoil 140, the airfoil repair component 200 has a radial height that is less than the span S of the airfoil 100 (FIG. 1).

The body 205 of the airfoil repair component 200 defines a repair attachment section 242 for attaching the airfoil repair component 200 to the cropped airfoil 140. As shown in FIGS. 3A, 3B, and 4, the cropped airfoil 140 comprises a cropped airfoil attachment section 142, which is the radially outermost section of the cropped airfoil 140. Likewise, as depicted in FIGS. 3A, 3B, and 4, the repair attachment section 242 is the radially innermost section of the airfoil repair component 200.

To attach the airfoil repair component 200 to the cropped airfoil 140, the repair attachment section 242 is aligned with the cropped airfoil attachment section 142 and the airfoil repair component 200 is secured to the cropped airfoil 140, e.g., by welding the airfoil repair component 200 to the cropped airfoil 140 as described in greater detail below. For instance, the repair attachment section 242 defines a repair joining face 244 (FIGS. 3A, 3B, 5, 8, 9A, 9B) and the cropped airfoil attachment section 142 defines a cropped joining face 144 (FIG. 7), and the repair joining face 244 interfaces with the cropped joining face 144 as the airfoil repair component 200 is aligned with the cropped airfoil 140. Then, the airfoil repair component 200 may be joined to the cropped airfoil 140, e.g., along the interface between the repair joining face 244 and the cropped joining face 144, through a welding or other appropriate joining process. It will be appreciated that the repair joining face 244 defines an inner end of the airfoil repair component 200 and an opposite tip 208 (FIGS. 4, 8) defines an outer end of the airfoil repair component 200, while the cropped joining face 144 defines an outer end of the cropped airfoil 140 and the opposite root 106 defines an inner end of the cropped airfoil 140.

As illustrated in FIGS. 3A and 3B, at least the repair attachment section 242 is oversized with respect to the cropped airfoil attachment section 142. For example, the repair attachment section 242 has a repair chord length $c_r$ longer than a cropped chord length $c_c$ of the cropped airfoil attachment section 142, i.e., the repair chord length longer $c_r$ than a cropped chord length $c_c$ of the cropped airfoil attachment section 142. As another example, the repair attachment section 242 is oversized with respect to the cropped airfoil attachment section 142 such that a repair width $w_r$ of the body 205 at the repair attachment section 242 is wider than a cropped width $w_c$ of the cropped airfoil 140 at the cropped airfoil attachment section 142. In some embodiments, the repair attachment section 242 may be oversized with respect to the cropped airfoil attachment section 142 such that either the repair chord length $c_r$ is longer than the cropped chord length $c_c$ or the repair width $w_r$ is wider than the cropped width $w_c$. In other embodiments, such as illustrated in FIGS. 3A and 3B, both the repair chord length $c_r$ and the repair width $w_r$ are larger than the cropped chord length $c_c$ and the cropped width $w_c$, respectively, i.e., the repair chord length $c_r$ is longer than the cropped chord length $c_c$ and the repair width $w_r$ is wider than the cropped width $w_c$.

Like the chord length c described above, the repair chord length $c_r$ extends along the axial direction A from the repair leading edge 210 to the repair trailing edge 212 (or from the component first edge to the component second edge), and the cropped chord length $c_c$ extends along the axial direction A from the cropped leading edge 110c to the cropped trailing edge 112c (or from the cropped first edge to the cropped second edge). The width of each airfoil section is measured along the circumferential direction C, from the pressure side to the suction side. Thus, the repair width $w_r$ extends from the repair pressure side 202 to the repair suction side 204 (or between the component first side and component second side of the airfoil repair component 200), and the cropped width $w_c$ extends along the circumferential C from the cropped pressure side 102c to the cropped suction side 104c (or between the cropped first side and the cropped second side of the cropped airfoil 140). At least the repair attachment section 242 of the airfoil repair component 200 is oversized with respect to the cropped airfoil attachment section 142 of the cropped airfoil 140 such that the repair attachment section 242 extends beyond the cropped airfoil attachment section 142 axially or chordwise as well as circumferentially or widthwise.

Referring still to FIGS. 3A and 3B, in at least some embodiments, the oversized repair attachment section 242 defines a flared extension of the body 205. As shown in FIGS. 3A and 3B, the repair attachment section 242 flares outward from the body 205, with the repair width $w_r$ of the repair attachment section 242 wider than a body width $w_b$ of the body 205. The flared or oversized repair attachment section 242 provides a larger repair joining face 244 than would be defined by a remainder of the body 205, which provides a larger surface to align with the cropped joining face 144 that can help in aligning or positioning the airfoil repair component 200 with the cropped airfoil 140. For example, the larger repair joining face 244 of the oversized repair attachment section 242 may be easier to align with the cropped joining face 144 than a joining face that was approximately the same size and shape as the cropped joining face 144 of the cropped airfoil 140. That is, the flared, oversized repair attachment section 242 provides a larger land on the airfoil repair component 200 to improve initial part fitment allowance. The rest of the body 205 may be net shape, e.g., the flared extension defined by the repair attachment section 242 may be the only oversized portion of the airfoil repair component 200, with the remainder of the airfoil repair component 200 being the same shape and size as the portion of the original airfoil 100 that the airfoil repair component 200 is replacing.

Turning to FIG. 4, in some embodiments, the entire airfoil repair component 200 is oversized with respect to the cropped airfoil 140. For instance, the body 205 of the airfoil repair component is oversized with respect to the cropped airfoil attachment section 142 such that the body 205 away from or outside of the repair attachment section 242 has a body chord length $c_b$ longer than the cropped chord length $c_c$ and a body width $w_b$ wider than the cropped width $w_c$. In addition to the body 205, the repair attachment section 242 is oversized with respect to the cropped airfoil attachment section 142 as described above, i.e., the repair chord length $c_r$ is longer than the cropped chord length $c_c$, and the repair width $w_r$ is wider than the cropped width $w_c$. As such, the airfoil repair component 200 may be overall larger than the cropped airfoil 140.

As shown in FIG. 4, the oversized, larger airfoil repair component 200 thus has "extra" or additional material, which may be machined away after the airfoil repair component 200 is attached to the cropped airfoil 140 to recover the desired net shape of the original undamaged airfoil 100. That is, as illustrated in FIG. 4, the net shape of the airfoil 100 is contained within the oversized airfoil repair component 200, and the net shaped is revealed through processing (e.g., machining, deformation processing, etc.) after the airfoil repair component 200 is attached to the cropped airfoil 140. In at least some embodiments, the oversized airfoil repair component 200 provides a greater margin of error in aligning the airfoil repair component 200 with the cropped airfoil 140, e.g., as compared to an airfoil repair component 200 that is enlarged or oversized locally, such as only in the region of the repair attachment section 242. For example, an airfoil repair component 200 that is enlarged or oversized overall (instead of a locally enlarged/oversized airfoil repair component 200) may be used to repair a damaged airfoil 100 of a blisk 122 because there is less room to observe/detect and ensure the alignment of the airfoil repair component 200 with the cropped airfoil 140 on a blisk 122 because other airfoils 100 are adjacent the cropped airfoil 140. The overall enlarged/oversized airfoil repair component 200 allows less precise placement of the airfoil attachment section 242 against the cropped airfoil attachment section 142 (e.g., compared to a locally enlarged or oversized airfoil repair component 200, which may be used with a removable airfoil 100) because the additional material can be machined away after attachment to define the shape of the airfoil 100.

In contrast, the airfoil repair component 200 illustrated in FIGS. 3A and 3B is locally enlarged or oversized, which an increased chord length $c_r$ and increased width $w_r$ only in the repair attachment section 242 as described above. The body 205 of the airfoil repair component 200 shown in FIGS. 3A and 3B has the final shape of the airfoil 100, i.e., the body 205 is shaped like the original, undamaged airfoil 100. In at least some embodiments, the repair attachment section 242 is consumed as the airfoil repair component 200 is attached to the cropped airfoil 140 such that, unlike the overall enlarged/oversized airfoil repair component 200 of FIG. 4, little to no processing is required once the airfoil repair component 200 is attached to the cropped airfoil 140 because the body 205 of the airfoil repair component 200 already defines the final shape of the airfoil 100.

As shown in FIGS. 3A, 3B, and 4, the repair joining face 244 and the cropped joining face 144 interface in a plane-to-plane interaction. Stated differently, there is plane-to-plane contact between the airfoil repair component 200 and the cropped airfoil 140. This interaction is designed to minimize the influence of alignment inaccuracies and counteract joining-induced stresses. When the airfoil repair component 200 is joined to the cropped airfoil 140 in a welding process, the repair joining face 244 and the cropped joining face 144 are consumed in the welding process as the two components are joined together. The planar interaction between the airfoil repair component 200 and the cropped airfoil 140 can help ensure the airfoil repair component 200 is properly aligned with respect to the cropped airfoil 140 to define the overall shape of the airfoil 100 once the joining process, and, if needed, any post-joining processing such as machining, deformation processing (e.g., cold or hot working, etc.), is complete.

Referring to FIG. 5, the repair joining face 244 may include one or more projections 246 extending away from the repair joining face 244, e.g., toward the cropped joining face 144 (FIG. 7) when the airfoil repair component 200 is positioned with respect to the cropped airfoil 140 for joining the airfoil repair component 200 to the cropped airfoil 140, such as shown in FIG. 6. Additionally or alternatively, although not shown in FIG. 5, the cropped joining face 144 may include one or more projections 246 extending away from the cropped joining face 144, e.g., toward the repair joining face 244 when the airfoil repair component 200 is positioned with respect to the cropped airfoil 140 for joining the airfoil repair component 200 to the cropped airfoil 140. The one or more projections 246 change the profile of the repair joining face 244 (and/or the cropped joining face 144, where the cropped joining face 144 includes one or more projections 246 such as shown in FIG. 5 with respect to the repair joining face 244), e.g., to help direct current during a joining process, and each projection 246 may have any suitable shape and size. As shown in FIG. 5, the depicted projection 246 narrows the repair joining face 244 from the body 205 toward the cropped airfoil 140 such that a smaller surface area of the airfoil repair component 200 contacts the cropped airfoil 140—e.g., compared to the surface area of the airfoil joining face 244 without the projection 246— when the airfoil repair component 200 and cropped airfoil 140 are brought together for joining. Thus, the one or more projections 246, which are consumed during the joining process, help localize the current when the joining process begins, which can help focus heat in a desired area early in the joining process.

In some embodiments, the airfoil 100 comprises a twist along the span S. For example, in FIG. 2 the root 106 of the airfoil 100 may be offset from the tip 108 of the airfoil 100 along the circumferential direction C such that, e.g., the leading edge 100 does not extend in a generally straight line from the root 106 to the tip 108. The twist, offset, or deviation from linearity need not exist over the entire span S, e.g., the airfoil 100 may not have a twist along a length of the span S. For instance, in some embodiments such as depicted in FIG. 4, the airfoil 100 may extend substantially linearly along the radial direction R from about mid-span to the tip 108, i.e., the twist may be located between the root 106 and mid-span. Nonetheless, regardless of the location or degree of the twist, when repaired with an airfoil repair component 200, the repaired airfoil 100 should also comprise a twist such that the repaired airfoil 100 has the same final shape as the original, undamaged airfoil 100.

As illustrated in FIG. 3A, in at least some embodiments, the airfoil repair component 200 may be shaped to eliminate the twist in the repair attachment section 242. For example, the repair attachment section 242 extends substantially straight or linearly along the radial direction R while the airfoil repair component 200 radially above the repair attachment section 242 incorporates a twist along the span S (FIG. 1). In some embodiments, the cropped airfoil attachment section 142 of the cropped airfoil 140 also may be substantially straight or linear along the radial direction R. For instance, as shown at a location 145 in FIG. 3A, the twist may be removed, or the cropped airfoil 140 may be straightened, in the region of the cropped airfoil attachment section 142 using a localized coining operation or similar process. Having a straight or linear cropped airfoil attachment section 142 and/or repair attachment section 242 can help define a planar interaction between the cropped airfoil 140 and the airfoil repair component 200 along the cropped joining face 144 and the repair joining face 244, which can help improve alignment between the cropped airfoil 140 and the airfoil repair component 200. Further, the straight or linear cropped airfoil attachment section 142 and/or repair attachment section 242 are consumed during the joining process, e.g., as the airfoil repair component 200 is welded to the cropped airfoil 140, such that the airfoil geometry that is modified to remove or be without the twist disappears during the joining process, leaving the repaired airfoil 100 with only the twist of the original airfoil 100.

Although the flared or locally oversized airfoil repair component 200 is described with respect to an individual airfoil 100 (FIGS. 3A and 3B) and the overall oversized repair component 200 is described with respect to a blisk 122 (FIG. 4), it will be appreciated that the features described with respect to FIGS. 3A and 3B and the features described with respect to FIG. 4 apply to airfoil repair components 200 for either individual airfoils 100 or airfoils 100 incorporated into a blisk 122. That is, the illustrations provided herein are not intended to limit the application of the features shown therein. Further, the projections 246 likewise can be used for airfoil repair components 200 and/or cropped airfoils 140 for either individual airfoils 100 or airfoils 100 incorporated into a blisk 122. Similarly, other features described herein, although shown or described with respect to individual airfoils 100 or blisk airfoils 100, may be used for airfoil repair components 200 and/or cropped airfoils 140 for either individual airfoils 100 or airfoils 100 incorporated into a blisk 122.

Turning now to FIGS. 6 through 14, in at least some embodiments, the airfoil repair component 200 is part of an airfoil repair system 300 (FIGS. 12, 14). The airfoil repair system 300 includes components for locating, positioning, and holding the airfoil repair component 200 with respect to the cropped airfoil 140. The airfoil repair system 300 also includes components facilitating the joining of the airfoil repair component 200 to the cropped airfoil 140.

Referring particularly to FIG. 6, the airfoil repair system 300 includes an electrode assembly 302. The electrode assembly 302 comprises a repair component electrode 304 and a cropped airfoil electrode 306. The repair component electrode 304 receives the airfoil repair component 200, and the cropped airfoil electrode 306 receives the cropped airfoil 140. As described herein, an electrical current is passed through the repair component electrode 304, with the airfoil repair component 200 positioned therein, and the cropped airfoil electrode 306, with the cropped airfoil 140 positioned therein, to join the airfoil repair component 200 to the cropped airfoil 140. For example, a solid state resistance welding (SSRW) technique may be used to weld the airfoil repair component 200 to the cropped airfoil 140 by passing electrical current through the airfoil repair component 200 and the cropped airfoil 140 while the repair joining face 244 is in contact with (or is interfacing with) the cropped joining face 144; the repair component electrode 304 and cropped airfoil electrode 306 also can provide a compressive axial force, e.g., toward the end of the current pulses, to help weld the airfoil repair component 200 and cropped airfoil 140. Other welding or joining techniques or processes may be used as well.

Turning to FIG. 7, in some embodiments, the cropped airfoil electrode 306 comprises a dovetail block 308, an electrode body 310, and a retention assembly 312. As previously described, the cropped airfoil 140 formed from an individual or removable airfoil 100, as illustrated in FIG. 1, comprises a dovetail 120 that helps secure the airfoil 100 to a rotor disk. As depicted in FIG. 7, the dovetail 120 is receivable within the dovetail block 308 of the cropped airfoil electrode 306. For instance, the dovetail block 308 defines a dovetail opening 314 having a shape complementary to the shape of the dovetail 120, and the dovetail 120 is received in the complementary shaped dovetail opening 314 of the dovetail block 308. Thus, the dovetail block 308 helps secure and/or stabilize the cropped airfoil 140 within the cropped airfoil electrode 306 and constrains the cropped airfoil 140 along a stacking axis $A_S$ (FIG. 6) or along any longitudinal orientation where stabilization is beneficial to the joining process. The dovetail block 308 may or may not be constrained with respect to the cropped airfoil electrode 306. For example, the dovetail block 308 may be locked into position using a set screw or the like, or no hard constraint may be placed on the dovetail block 308 such that it is free to move with respect to the cropped airfoil electrode 306. It will be appreciated that in other embodiments, e.g., where the cropped airfoil 140 does not include a dovetail 120, such as in blisk 122 embodiments, the dovetail block 308 of the cropped airfoil electrode 306 may be omitted.

Further, as depicted in FIG. 7, the cropped airfoil 140 is removably secured to the electrode body 310 by one-handed manipulation of the retention assembly 312. For example, the retention assembly 312 comprises a thrust element 316, such as a lever or button, and a stop 318, which may be a pin or the like. The thrust element 316 and the stop 318 are disposed opposite one another along the cropped chord length $c_c$, e.g., when the cropped airfoil 140 is loaded in the cropped airfoil electrode 306, one of the thrust element 316 and the stop 318 is disposed against the cropped leading edge 110c, and the other of the thrust element 316 and stop 318 is disposed against the cropped trailing edge 112c. The thrust element 316 may be manipulated by a user, e.g., using a single finger (such as a thumb) or a single hand, to load and unload the cropped airfoil 140 from the cropped airfoil electrode 306. For instance, each of the thrust element 316 and the stop 318 provides a point constraint on the cropped airfoil 140, and the thrust element 316 is manipulable, or moveable, to relax the point constraint provided by the thrust element 316 to load and/or unload the cropped airfoil 140 with respect to the cropped airfoil electrode 306. More particularly, the thrust element 316 may be moved away from the cropped airfoil 140, or the area where the cropped airfoil 140 is positioned when loaded into the electrode body 310, to load and/or unload the cropped airfoil 140 from the cropped airfoil electrode 306.

Referring now to FIG. 8, in at least some embodiments, the airfoil repair component 200 similarly is removably secured to the repair component electrode 304. For example, like the cropped airfoil electrode 306, the repair component electrode 304 shown in FIG. 8 comprises an electrode body 320 and a retention assembly 322. To differentiate between the electrode body 310 and the electrode body 320 more easily, in at least some instances herein, the electrode body 310 of the cropped airfoil electrode 306 may be referred to as the cropped airfoil electrode body 310, and the electrode body 320 of the repair component electrode 320 may be referred to as the repair component electrode body 320.

The airfoil repair component 200 is removably secured to the electrode body 320 by one-handed manipulation of the retention assembly 322. In the embodiment of FIG. 8, the retention assembly 322 comprises a thrust element 326, such as a lever or button, and a stop 328, which may be a pin or the like. The thrust element 326 and the stop 328 are disposed opposite one another along the repair chord length $c_r$. For instance, when the airfoil repair component 200 is loaded in the repair component electrode 304, one of the thrust elements 326 and stop 328 is disposed against the repair leading edge 210, and the other of the thrust elements 326 and stop 328 is disposed against the repair trailing edge 212.

The thrust element 326 may be manipulated by a user, e.g., using a single finger (such as a thumb) or a single hand, to load and unload the airfoil repair component 200 from the repair component electrode 304. For example, each of the thrust element 326 and the stop 328 provides a point constraint on the airfoil repair component 200. The thrust element 326 is manipulable, or moveable, to relax the point constraint provided by the thrust element 326 to load and/or unload the airfoil repair component 200 with respect to the repair component electrode 304. That is, the thrust element 326 may be moved away from the airfoil repair component 200, or the area where the airfoil repair component 200 is positioned when loaded into the electrode body 320, to load and/or unload the airfoil repair component 200 from the repair component electrode 304.

FIGS. 9A and 9B illustrate another embodiment of the repair component electrode 304. In the embodiment of FIGS. 9A and 9B, the retention assembly 322 includes a stabilization element 324 defining an opening 325 that receives the airfoil repair component 200, with a perimeter 323 extending about the opening 325. Further, the stabilization element 324 includes a stabilization arm 327, which contacts the repair suction side 204 to urge the airfoil repair component 200 into a first stop 328a contacting the repair pressure side 202, and a second stop 328b, which provides at least a point constraint on the repair leading edge 210. Referring particularly to FIG. 9B, the stabilization arm 327 includes a set screw 329 for tightening the stabilization arm 327 against the airfoil repair component 200, with one or more springs used to retract the stabilization arm 327. In this way, the smallest force may be used to hold the airfoil repair component 200 in place, such that the airfoil repair component 200 is not over-constrained. In other embodiments, other means may be used to advance and retract the stabilization arm 327 with respect to the airfoil repair component 200.

In various embodiments, the components of the stabilization element 324 (i.e., perimeter 323, stabilization arm 327, first stop 328a, and second stop 328b) may provide point, line, and/or planar constraint on the airfoil repair component 200, depending on, e.g., the configuration of the stabilization element component and the airfoil repair component 200. It will be appreciated that the stabilization arm 327 may be manipulated to constrain or release the airfoil repair component 200, with the perimeter 323, stabilization arm 327, first stops 328a, and second stop 328b of the stabilization element 324 providing sufficient constraint to stabilize the airfoil repair component 200 for the joining process without over-constraining the airfoil repair component 200.

Turning now to FIGS. 10A and 10B, in some embodiments, the repair component electrode 304 comprises a repair component electrode insert 330 that surrounds at least a portion of the airfoil repair component 200 and is removable with respect to the repair component electrode body 320. As shown in FIG. 10A, the repair component electrode insert 330 is received in the repair component electrode body 320. In FIG. 10B, the repair component electrode insert 330 is shown removed from the repair component electrode body 320.

As shown in FIG. 10B, the repair component electrode insert 330 defines an inert gas manifold 332 for receipt of an inert gas. Further, the repair component electrode insert 330 defines a first plurality of grooves 334a extending from the inert gas manifold 332 along a first outer surface 336a of the repair component electrode insert 330 and a second plurality of grooves 334b extending from the inert gas manifold 332 along a second outer surface 336b of the repair component electrode insert 330. The first plurality of grooves 334a and the second plurality of grooves 334b direct the inert gas IG from the inert gas manifold 332 along a first side 338a and a second side 338b, respectively, of the repair component electrode insert 330 to define an inert gas shield around the airfoil repair component 200.

An inert gas shield is useful, e.g., when the airfoil 100 and airfoil repair component 200 are formed from a reactive material, such as a titanium alloy or the like. For instance, a reactive material may have undesired reactions during some joining processes, such as solid state resistance welding (SSRW), which could contaminate the weld interface between the cropped airfoil 140, the airfoil repair component 200. By providing a shield or barrier of inert gas, the undesirable atmospheric reactions can be reduced or eliminated.

In the illustrated embodiment of FIGS. 9A and 9B, the repair component electrode insert 330 engages both the leading edge and trailing edge profiles of the airfoil repair component 200. That is, the repair component electrode insert 330 is shaped such that an inner surface 340 of the repair component electrode insert 330 engages both the repair leading edge 210 and the repair trailing edge 212. Further, the repair component electrode insert 330 includes a leading edge guide 331a and a trailing edge guide 331b. The leading and trailing edge guides 331a, 331b are minimally conductive, high temperature and wear resistant guides that help stabilize the relatively thin edges of the airfoil repair component 200, e.g., in titanium airfoil repair applications. For instance, the leading and trailing edge guides 331a, 331b hold the leading edge 210 and trailing edge 212, respectively, to stabilize the airfoil repair component 200. The leading and trailing edges guides 331a, 331b can also control heat and the leading edge 210 and trailing edge 212, respectively, to help prevent overheating the leading and trailing edges 210, 212 during the joining process. The leading and trailing edge guides 331a, 331b may be made from a material selected to minimize conduction, withstand high temperatures, and resist wear.

In the depicted embodiment, the repair component electrode insert 330 defines a cavity 342 for receipt of the airfoil repair component 200. In some embodiments, only one of the repair leading edge 210 and the repair trailing edge 212, or only a portion of one or both of the repair leading edge 210 and the repair trailing edge 212, is engaged by the repair component electrode insert 330. Engagement between the repair component electrode insert 330 and the airfoil repair component 200 can help stabilize airfoil repair component 200 within the repair component electrode 304 by preventing buckling or lapping of the thinner leading and trailing edges of the cropped airfoil 140 and/or the airfoil repair component 200.

As further shown in FIGS. 10A and 10B, in some embodiments the repair component electrode insert 330 comprises a first half 330a and a second half 330b. In the depicted embodiment, the repair component electrode insert 330 is divided chordwise or along the axial direction with respect to the airfoil repair component 200 to define the first half 330a and second half 330b. Each of the first half 330a and the second half 330b defines a portion of the inert gas manifold 332 such that together the two halves 330a, 330b define the inert gas manifold 332.

Moreover, each of the first half 330a and the second half 330b of the depicted repair component electrode insert 330 defines a portion of the plurality of grooves 334. More particularly, the first half 330a defines a first plurality of grooves 334a of the plurality of grooves 334, and the second half 330b defines a second plurality of grooves 334b of the plurality of grooves 334. Each of the first plurality of grooves 334a and the second plurality of grooves 334b extends from the inert gas manifold 332 along the respective first half 330a and second half 330b of the repair component electrode insert 330.

As illustrated in the embodiment of FIGS. 10A and 10B, each groove 334 of the plurality of grooves 334 extends parallel to the remaining grooves 334 of the plurality of grooves 334. In other embodiments, the plurality of grooves 334 may not all be parallel to one another, but instead, at least one groove 334 of the plurality of grooves 334 may extend in a different direction with respect to one or more of the plurality of grooves 334. Further, the plurality of grooves 334 may be generally symmetric with respect to the repair component electrode insert 330. For example, for the halved repair component electrode insert 330 shown in FIGS. 10A and 10B, the number of the first plurality of grooves 334a equals the number of the second plurality of grooves 334b, and each respective groove 334a of the first plurality of grooves 334a is defined across from a respective groove 334b of the second plurality of grooves 334b along the widthwise dimension of the airfoil repair component 200. However, in other embodiments, the plurality of grooves 334 may not be symmetric, e.g., a different number of grooves 334a may be defined in the first half 330a than the number of grooves 334b defined in the second half 330b.

Referring to FIG. 10C, in at least some embodiments, the repair component electrode 304 includes serrations 343 defined in the repair component electrode body 320. The serrations 343 are openings or areas without material in the repair component electrode body 320. As shown in FIG. 10C, each serration 343 includes a change in direction, e.g., a serration 343 includes a first portion angling from a first side of the repair component electrode body 320 toward an opposite second side of the repair component electrode body 320 and a second portion angling from the second side of the repair component electrode body 320 toward the opposite first side of the repair component electrode body 320. The serrations 343 can act like a spring or other biased member to achieve better or improved contact between the repair component electrode 304 and the airfoil repair component 200. Further, the serrations 343 can provide cooling, especially at the leading edge 210 and/or trailing edge 212 of the airfoil repair component 200 during the joining process, e.g., to protect the relatively thin leading edge 210 and trailing edge 212. For example, the serrations 343 can throttle or choke current passing through the repair component electrode 304 to the airfoil repair component 200 at the leading edge 210 and/or trailing edge 212 to help avoid overheating the leading edge 210 and/or trailing edge 212 as the airfoil repair component 200 is joined to the cropped airfoil 140.

Turning now to FIGS. 11, 12, and 13, the airfoil repair system 300 includes a tooling assembly 344 for positioning the airfoil repair component 200 with respect to the cropped airfoil 140. Referring particularly to FIG. 11, in at least some embodiments, the tooling assembly 344 comprises an alignment assembly 346. In the embodiment of FIG. 11, the alignment assembly 346 is an independent axis three degree-of-freedom manipulator configured to adjust the position of the airfoil repair component 200 (enclosed within the repair component electrode 304 in FIG. 11) with respect to the cropped airfoil 140 (enclosed within the cropped airfoil electrode 306 in FIG. 11) along three separate axes defined by the cropped airfoil 140. As shown, the alignment assembly 346 includes a first rotatable knob 348a, which adjusts the position of the airfoil repair component 200 along a first degree of freedom, the axial direction A or chordwise along the cropped airfoil 140; a second rotatable knob 348b, which adjusts the position of the airfoil repair component 200 along a second degree of freedom, the circumferential direction C or widthwise along the cropped airfoil 140; and a third rotatable knob 348c, which adjusts the position of the airfoil repair component 200 with respect to a third degree of freedom, the stacking axis $A_S$. Using rotatable knobs 348a, 348b, 348c to adjust the position of the airfoil repair component 200 may allow more precise alignment of the airfoil repair component 200 with respect to the cropped airfoil 140 than other modes of alignment. However, it will be appreciated that, in addition to or in place of rotatable knobs, in other embodiments the alignment assembly 346 may utilize other means for adjusting the position or alignment of the airfoil repair component 200 along the various degrees of freedom. It will be appreciated that the illustrated alignment assembly 346 is by way of example only. In other embodiments, the alignment assembly 346 can manipulate or adjust the position of the airfoil repair component 200 and/or the cropped airfoil 140 in any number of degrees of freedom, e.g., less or more than three.

Further, using the alignment assembly 346, the airfoil repair component 200 may be tilted or biased with respect to the cropped airfoil 140, e.g., to help ensure a desired geometry of the joined airfoil repair component 200 and cropped airfoil 140. For example, the position of the airfoil repair component 200 may be manipulated along one or more degrees of freedom to control the post-joining (e.g., post-weld) geometry, which can minimize or eliminate post-joining cold working. As such, the alignment assembly 346 can help position the airfoil repair component 200 with respect to the cropped airfoil 140 (e.g., with a few degrees of tilt, such as within a range of 0°-10° with respect to the axial direction A, radial direction R, and/or circumferential direction C, or the like) to closely resemble or approximate the post-joining geometry of the airfoil 100.

Referring now to FIG. 12, in at least some embodiments, the tooling assembly comprises a feedback system 350 including at least one feedback device 352a and 352b located to determine a position of the airfoil repair component 200 with respect to the cropped airfoil 140 and/or to determine the size (e.g., height, width, and/or thickness) of the airfoil repair component 200, repair component electrode 304, etc. Determining the size of the respective component may be referred to as on-machine probing, in which one determines the size of a component and then decides where to position the component for a desired process.

In the embodiment of FIG. 12, the feedback system 350 includes a first feedback device 352a and a second feedback device 352b positioned radially outward from the electrode assembly 302. The first feedback device 352a and the second feedback device 352b may provide feedback as to the position of the repair component electrode 304 (in which the airfoil repair component 200 is disposed) with respect to the cropped airfoil electrode 306 (in which the cropped airfoil 140 is disposed), or with respect to another reference point or component within the airfoil repair system 300, and/or as to the size of the airfoil repair component 200 and/or the repair component electrode 304. The feedback can be used to ascertain whether the airfoil repair component 200 is properly aligned with the cropped airfoil 140 prior to a joining process and, if not, may assist in repositioning the airfoil repair component 200 until the airfoil repair component 200 is adequately aligned with the cropped airfoil 140 to begin the joining process. It will be appreciated that the one or more feedback devices, such as the first feedback device 352a and the second feedback device 352b, may be cameras, non-contact or contact-type gages, non-contact or contact-type measurement devices, or the like or a combination thereof that provide images, location data, and/or other data to a user interface, controller, etc. to allow a user or operator, a controller, etc. to manually or automatically initiate repositioning of the airfoil repair component 200 or the start of the joining process. Further, although not shown in FIG. 12, the feedback system 350 may be supported by a frame or other support system that allows the electrode assembly 302 to be removed from and replaced within the field of view or field of sensing of the at least one feedback device 352, e.g., after one airfoil repair component 200 is joined to one cropped airfoil 140 and another airfoil repair component 200 is prepared to be joined to another cropped airfoil 140.

Turning to FIG. 13, a cropped airfoil portion 344C of the tooling assembly 344 for stabilizing the cropped airfoil 140 of a blisk 122 is illustrated. As shown in FIG. 13, in at least some embodiments, the cropped airfoil portion 344C of the tooling assembly 344 includes a frame 354 that supports a hoop clamp 356, a hydraulic clamp assembly 358 including an electrode element 360 and hydraulic cylinder 362, and a band electrode 364. The hoop clamp 356 and hydraulic clamp assembly 358 stabilize the cropped airfoil 140, e.g., such that the airfoil repair component 200 can be aligned with the cropped airfoil 140 to perform a joining operation. The hoop clamp 356 is not directly coupled to the frame 354 but is joined to the frame 354 in such a way to avoid inducing any significant stress and/or distortion to the frame 354, which helps ensure the highest level of accuracy while utilizing the least total material. As depicted in FIG. 13, the electrode element 360 of the hydraulic clamp assembly 358 extends from the hydraulic cylinder 362 and presses the cropped airfoil 140 into the band electrode 364, which is supported by the hoop clamp 356 such that the cropped airfoil 140 is pressed into the hoop clamp 356.

Further, the hoop clamp 356 extends about the hydraulic clamp assembly 358 and is free to slide within the frame 354, and the hydraulic cylinder 362 is supported by the frame 354. For example, in the arrangement depicted in FIG. 13, the hoop clamp 356 applies an enclosed structural loop of squeezing force to reduce or eliminate bending stress from the frame 354 and other interrelated tooling components. Thus, the tooling assembly 344 decouples the holding elements from the electrodes to help eliminate the bending moment on the cropped airfoil 140 and airfoil repair component 200.

Moreover, one or more openings 366 may be formed in the hoop clamp 356, as well as other components of the cropped airfoil portion 344C of the tooling assembly 344, to accommodate airfoils 100 of the blisk 122 that are adjacent the cropped airfoil 140. It will be appreciated that the tooling assembly cropped airfoil portion 344C may be made as compact as possible, e.g., for easier post-joining extraction of the blisk 122, and the cropped airfoil portion 344C captures the cropped airfoil 140 to position the blisk 122 and the cropped airfoil 140 with respect to the airfoil repair component 200. Further, the cropped airfoil portion 344C of the tooling assembly 344 can help stabilize the cropped airfoil electrode 306 and help ensure contact between the cropped airfoil 140 and the cropped airfoil electrode 306. Additionally, the cropped airfoil portion 344C of the tooling assembly 344 helps align the airfoil repair component 200 with the blisk 122 and its cropped airfoil 140, e.g., as shown in FIG. 14.

FIG. 14 provides a side perspective view of the tooling assembly 344, including airfoil-side tooling, i.e., the cropped airfoil portion 344C, and airfoil repair component-side tooling, i.e., the airfoil repair component portion 344R. For example, the tooling assembly 344 as illustrated in FIG. 14 may be used to stabilize a blisk 122 and an airfoil repair component 200, with the respective repair component electrode 304 and cropped airfoil electrode 306, while joining the airfoil repair component 200 to a cropped airfoil 140 of the blisk 122. As such, as shown in FIG. 14, the cropped airfoil portion 344C of the tooling assembly 344 (or segments thereof) may be mounted onto a slide rail 368, or other similar support element, to help move the blisk 122 with respect to the airfoil repair component portion 344R of the tooling assembly 344. As further depicted in FIG. 14, the feedback system 350 may be mounted vertically below the cropped airfoil 140 and airfoil repair component 200 in the tooling assembly 344. It will be appreciated that, in other embodiments, the feedback system 350 may be mounted or supported at any suitable location of the airfoil repair system 300, e.g., above, below, on one side, at an angle relative to the airfoil repair system 300, or one or more components of the feedback system 350 may be mounted in one location while one or more components of the feedback system 350 are mounted in one or more different locations.

Referring now to FIG. 15, the present subject matter also provides methods of repairing an airfoil. As shown in FIG. 15, a method 1500 of repairing an airfoil 100 comprises (1502) removing a damaged portion 130 of the airfoil 100 to form a cropped airfoil 140. As described herein, the damaged portion 130 may include a damaged area 128, which is a hollow area or cavity such as an opening, crack, gap, aperture, hole, etc. in the airfoil 100. For instance, as described with respect to FIG. 1, the airfoil 100 may include a section line SL, which may be, e.g., one half of the distance between the tip 108 at the leading edge and a leading edge fillet tangency T. The damaged portion 130 (including the damaged area 128) may be removed above, below, or at (or radially outward from, radially inward from, or at) the section line SL.

Further, the method 1500 may comprise (1504) locally removing a spanwise twist from the cropped airfoil 140, which also may be referred to as coining the cropped airfoil 140 to remove the twist along at least a portion of the airfoil span S. As described herein, e.g., with respect to FIG. 3A, in at least some embodiments, the cropped airfoil 140 may be shaped to eliminate the twist in the cropped airfoil attachment section 142, and the airfoil repair component 200 may be shaped to eliminate the twist in the repair attachment section 242. For example, each of the cropped airfoil attachment section 142 and the repair attachment section 242 extends substantially straight or linearly along the radial direction R while the remainder of the cropped airfoil 140 and the airfoil repair component 200 incorporates a twist along the span S. Having a straight or linear cropped airfoil attachment section 142 and/or repair attachment section 242 can help define a planar interaction or surface or area contact between the cropped airfoil 140 and the airfoil repair component 200 along the cropped joining face 144 and the repair joining face 244, which can help improve alignment between the cropped airfoil 140 and the airfoil repair component 200. Further, the straight or linear section cropped airfoil attachment section 142 and/or repair attachment section 242 are consumed during the joining process, e.g., as the airfoil repair component 200 is welded to the cropped airfoil 140, such that, during the joining process, the airfoil geometry that is modified to remove or be without the twist is expelled from the weld interface in the form of weld flash, and the repaired airfoil 100 has the twist of the original airfoil 100. It will be appreciated that, in other embodiments, the original airfoil 100 may not include a spanwise twist such that (1504) locally removing the spanwise twist may be omitted from the method 1500.

Referring still to FIG. 15, the method 1500 further may comprise (1506) disposing the cropped airfoil 140 in a cropped airfoil electrode 306 and (1508) disposing an airfoil repair component 200 within a repair component electrode 304. The cropped airfoil 140, airfoil repair component 200, repair component electrode 304, and cropped airfoil electrode 306 may be configured as described herein, e.g., with respect to FIGS. 1-14. For instance, the repair component electrode 304 and cropped airfoil electrode 306 may be part of an electrode assembly 302, and in at least some embodiments, the repair component electrode 304 comprises a repair component electrode insert 330 removably received within a repair component electrode body 320. The repair component electrode insert 330 may include an inert gas manifold 332 and a plurality of grooves 334 for creating an inert gas shield around the airfoil repair component 200.

The method 1500 also may include (1510) positioning the airfoil repair component 200 with respect to the cropped airfoil 140. As described herein, in at least some embodiments, positioning the airfoil repair component 200 with respect to the cropped airfoil 140 comprises locating the repair component electrode 304 using a feedback system to ascertain a position of the airfoil repair component 200 with respect to the cropped airfoil 140. For example, the feedback system 350 may include one or more feedback devices 352, such as cameras, measurement gages, or the like, positioned about the electrode assembly 302 to provide feedback as to the position of the repair component electrode 304 with respect to the cropped airfoil electrode 306.

Further, in at least some embodiments, positioning the airfoil repair component 200 with respect to the cropped airfoil 140 comprises manipulating an alignment assembly 346, such as an independent axis degree-of-freedom manipulator, to reposition the airfoil repair component 200 and/or the cropped airfoil 140 along one axes, e.g., defined by the cropped airfoil 140. For instance, the alignment assembly 346 may comprise three rotatable knobs, e.g., a first knob 348a, a second knob 348b, and a third knob 348c, where each knob 348a, 348b, 348c adjusts or manipulates the position of the repair component electrode 304 with respect to the cropped airfoil electrode 306 along one degree-of-freedom.

As further illustrated in FIG. 15, the method 1500 may comprise (1512) conducting a joining process to join the airfoil repair component 200 to the cropped airfoil 140, thereby replacing the damaged portion 130 removed from the airfoil 100 with the airfoil repair component 200. In at least some embodiments, the joining process comprises passing current through the cropped airfoil electrode 306 and the repair component electrode 304 to attach the airfoil repair component 200 to the cropped airfoil 140 and form a repaired airfoil. For example, passing current through the cropped airfoil electrode 306 and the repair component electrode 304 comprises welding the airfoil repair component 200 to the cropped airfoil 140 through solid state resistance welding. In other embodiments, other suitable methods for joining the airfoil repair component 200 to the cropped airfoil 140 may be used.

Further, for embodiments utilizing current to join the airfoil repair component 200 to the cropped airfoil 140, the airfoil repair system 300 may incorporate adaptive current control to improve yield. For instance, the airfoil repair system 300 may utilize weld luminescence and/or thermal imaging and a controller or the like to analyze and adjust the supplied current, e.g., to match the weld uniformity to a predetermined weld uniformity. The current may be adjusted, e.g., through manipulation of a pulsing sequence. By adjusting the weld during the joining process, increased yield or repair success may be achieved.

Additionally, or alternatively, the airfoil repair system 300 may utilize a variety of power sources. For example, for a resistance welding joining process (such as solid state resistance welding), the airfoil repair system 300 may utilize single-phase alternating current (AC), primary and secondary rectified direct current (DC), capacitive discharge (CD), or medium frequency DC (MFDC). MFDC, for instance, may allow finer current control, faster rise time, and a smaller footprint than AC and DC power sources. However, AC, DC, and CD power may provide advantages over MFDC for some applications of the airfoil repair system 300.

Referring still to FIG. 15, the method 1500 also may comprise (1514) obtaining a net shape finished part from the repaired airfoil 100. For example, the method 1500 may include post-joining processing to achieve the net shape of the original airfoil 100 from the repaired airfoil 100. For instance, after joining the airfoil repair component 200 to the cropped airfoil 140, the repaired airfoil 100, including the airfoil repair component 200, may be machined (e.g., milled or the like) to obtain the net shape of the original airfoil 100. As described herein, the airfoil repair component 200 may be locally oversized, e.g., in the region of the repair attachment section 242, or wholly oversized (i.e., the entire airfoil repair component 200 is oversized), such that at least a portion of the airfoil repair component 200 does not have the net shape of the airfoil 100. It will be appreciated that the term "oversized" refers to additional material of the airfoil repair component 200 that may provide increased margin or tolerance for alignment between the cropped airfoil 140 and the airfoil repair component 200 such that the two components do not have to be precisely aligned. For instance, the extra material of the oversized airfoil repair component 200 allows misalignment between the airfoil repair component 200 and the cropped airfoil 140 to be corrected through finish machining, e.g., the repair pressure side 202 or repair suction side 204 may be machined more or less than the other of the repair pressure side 202 and repair suction side 204 to compensate for widthwise misalignment. As another example, rather than machining after joining, the repaired airfoil 100 may undergo other post-joining processing, such as cold working or other deformation processing, to transform a non-conforming airfoil to a net shape part. In such embodiments, the repaired airfoil 100 may be largely the desired shape post-joining but may require some cold-working to shape the airfoil 100 within desired limits.

The airfoil repair component 200 may be oversized at least in the vicinity of where the airfoil repair component 200 is joined to the cropped airfoil 140, such that at least a portion of the oversized section of the airfoil repair component 200 may be consumed in the joining process. After joining the airfoil repair component 200 and the cropped airfoil 140, the portions of the airfoil repair component 200 that remain oversized may be machined to define the desired shape of the airfoil 100. As described herein, the airfoil repair component 200 for an individual airfoil 100 (having a platform and dovetail, e.g., as shown in FIG. 1) may be locally oversized while the airfoil repair component 200 for an airfoil 100 of a blisk 122 may be oversized all over, e.g., to minimize the risk of damaging the entire blisk 122 during repair of one blisk airfoil. Of course, in some embodiments, the airfoil repair component 200 for an individual airfoil 100 may be wholly oversized while the airfoil repair component 200 for an airfoil 100 of a blisk 122 may be locally oversized.

Various features of the airfoil repair component 200 and/or airfoil repair system 300 may be described or shown herein with respect to either an individual airfoil or a blisk airfoil. However, it will be appreciated that at least certain features of the airfoil repair component 200 and/or airfoil repair system 300 may apply to both configurations although shown and/or described herein with respect to only one configuration. Additionally, it will be understood that the various features of the airfoil repair component 200 and/or airfoil repair system 300 may be utilized in additional and/or alternative combinations than those shown and described herein.

Further, it will be appreciated that, although described above with respect to airfoil repairs, the present subject matter also could be used with respect to initial or new build parts. For example, the airfoil repair component 200 could, instead, be referred to as an airfoil component 200, which is joined to a cropped or base airfoil 140 to form a whole or complete airfoil 100. The airfoil component 200 can be formed as described herein as airfoil repair component 200, e.g., the airfoil component 200 can have a flared attachment section 242 or a body 205 that is overall oversized, and the airfoil component 200 has a component pressure side 202 opposite a component suction side 204 (or a component first side and a component second side) that each extend axially between a component leading edge 210 and a component trailing edge 212 (or a component first edge and a component second edge). For instance, the attachment section 242 attaches the airfoil component 200 to the cropped or base airfoil 140 and is oversized with respect to a cropped airfoil attachment section 142 such that the attachment section 242 has a component chord length $c_r$ longer than a cropped chord length $c_c$ of the cropped airfoil attachment section 142 and a component width $w_r$ wider than a cropped width $w_c$ of the cropped airfoil attachment section 142. Further, the airfoil component 200 can be received in an electrode like the repair component electrode 304, which may be referred to as an airfoil component electrode 304, and be positioned with the cropped or base airfoil 140 in its cropped airfoil electrode 306 using a tooling assembly 344 as described herein. Joining an airfoil component 200 to a cropped or base airfoil 140 may be useful, e.g., for some configurations of a blisk 122, where certain size airfoils 100 may be easier to manufacture as a blisk 122 using the joining techniques and features described herein.

Accordingly, as described herein, the present subject matter provides methods and apparatus for repairing airfoils. For instance, the present subject matter provides airfoil repair components for replacing damaged portions of airfoils, where the airfoil repair components may be oversized, morphed, and/or have an extended sacrificial tip. For example, a locally or wholly oversized airfoil repair component improves the chances of proper alignment between the airfoil repair component and a cropped airfoil (i.e., an airfoil with a damaged portion removed), with extra cleanup stock for post-joining processing to achieve net shape. Further, the present subject matter provides methods and apparatus for securing an airfoil repair component and/or a cropped airfoil within an electrode to eliminate over constraint and permit more accurate positioning of the airfoil repair component and/or cropped airfoil. For example, the present subject matter eliminates hand tools in loading and unloading components from their respective electrodes by using spring loaded design features and other easily hand-manipulated design features. Moreover, the present subject matter provides adaptive current control, e.g., using weld luminescence or thermal imaging feedback; integral bi-alloy inserts and inert gas shielding, e.g., for solid state resistance welding of reactive materials such as titanium alloys; alignment tooling, such as cameras, etc., for better and/or faster alignment of the airfoil repair component to the cropped airfoil; and compact stabilization tooling to permit easier post-joining extraction of the repaired airfoil. Other advantages of the subject matter described herein also may be realized by those of ordinary skill in the art.

Further aspects of the present disclosure are provided by the subject matter of the following clauses:

An airfoil component for attaching to a cropped airfoil, the cropped airfoil comprising a cropped airfoil attachment section and a cropped first side opposite a cropped second side, the cropped first side and the cropped second side each extending axially between a cropped first edge and a cropped second edge to define a cropped chord length, the airfoil component comprising a body having a component first side opposite a component second side, the body defining an attachment section for attaching the airfoil component to the cropped airfoil at the cropped airfoil attachment section, the attachment section extending axially between a component first edge and a component second edge to define a component chord length, wherein the attachment section is oversized with respect to the cropped airfoil attachment section such that the component chord length is longer than the cropped chord length.

The airfoil component of any preceding clause, wherein a cropped width is defined between the cropped first side and the cropped second side, wherein a component width is defined between the component first side and the component second side, and wherein the component width at the attachment section is wider than the cropped width at the cropped airfoil attachment section.

The airfoil component of any preceding clause, wherein the body outside of the attachment section has a body chord length longer than the cropped chord length of the cropped airfoil attachment section and a body width wider than the cropped width of the cropped airfoil attachment section.

The airfoil component of any preceding clause, wherein the repair attachment section defines a repair joining face and the cropped airfoil attachment section defines a cropped joining face, and wherein the repair joining face interfaces with the cropped joining face.

The airfoil component of any preceding clause, wherein the repair joining face and the cropped joining face interface in a planar interaction.

An airfoil repair system comprising a cropped airfoil comprising a cropped airfoil attachment section and a cropped first side opposite a cropped second side, the cropped first side and the cropped second side each extending axially between a cropped first edge and a cropped second edge to define a cropped chord length; an airfoil repair component comprising a body having a repair first side opposite a repair second side, the body defining a repair attachment section for attaching the airfoil repair component to the cropped airfoil at the cropped airfoil attachment section, the repair attachment section extending axially between a repair first edge and a repair second edge to define a repair chord length, the repair attachment section being oversized with respect to the cropped airfoil attachment section such that the repair chord length is longer than the cropped chord length; a repair component electrode for receipt of the airfoil repair component, the repair component electrode comprising a repair component electrode insert removable with respect to a repair component electrode body, the repair component electrode insert surrounding at least a portion of the airfoil repair component; and a tooling assembly for positioning the airfoil repair component with respect to the cropped airfoil.

The airfoil repair system of any preceding clause, wherein the repair component electrode insert defines an inert gas manifold for receipt of an inert gas and a plurality of grooves extending from the inert gas manifold along the repair component electrode insert.

The airfoil repair system of any preceding clause, wherein the repair component electrode insert comprises a first half and a second half, each of the first half and the second half defining a portion of an inert gas manifold for receipt of an inert gas and each of the first half and the second half defining a plurality of grooves extending from the inert gas manifold along the respective half of the repair component electrode insert.

The airfoil repair system of any preceding clause, further comprising a cropped airfoil electrode for receipt of the cropped airfoil, wherein the cropped airfoil electrode comprises a dovetail block, a cropped airfoil electrode body, and a retention assembly, wherein the cropped airfoil comprises a dovetail receivable within the dovetail block, and wherein the dovetail block is removably secured to the cropped airfoil electrode body by one-handed manipulation of the retention assembly.

The airfoil repair system of any preceding clause, wherein the repair component electrode body defines a plurality of serrations, each serration having a change in direction.

The airfoil repair system of any preceding clause, wherein a blisk comprises the cropped airfoil, and wherein the tooling assembly comprises a cropped airfoil portion for positioning the airfoil repair component with respect to the blisk.

The airfoil repair system of any preceding clause, wherein the tooling assembly comprises a feedback system including at least one feedback device located to determine at least one of a size and a position of the airfoil repair component with respect to the cropped airfoil.

The airfoil repair system of any preceding clause, wherein the tooling assembly comprises an alignment assembly, wherein the alignment assembly is configured to adjust the position of the airfoil repair component with respect to the cropped airfoil along one or more independent axes defined by the cropped airfoil.

The airfoil repair system of any preceding clause, wherein the repair component electrode comprises a point constraint, a line constraint, and a planar restraint with respect to the airfoil repair component, and wherein the point constraint is configured to be manipulated to release the airfoil repair component for removal from the repair component electrode.

A method of airfoil repair comprising removing a damaged portion of an original airfoil to form a cropped airfoil, wherein the cropped airfoil comprises a cropped airfoil attachment section and a cropped first side opposite a cropped second side, the cropped first side and the cropped second side each extending axially between a cropped first edge and a cropped second edge to define a cropped chord length; disposing the cropped airfoil in a cropped airfoil electrode; disposing an airfoil repair component within a repair component electrode, the repair component electrode comprising a repair component electrode insert removably received within a repair component electrode body, wherein the airfoil repair component comprises a body having a repair first side opposite a repair second side, the body defining a repair attachment section for attaching the airfoil repair component to the cropped airfoil at the cropped airfoil attachment section, the repair attachment section extending axially between a repair first edge and a repair second edge to define a repair chord length, the repair attachment section being oversized with respect to the cropped airfoil attachment section such that the repair chord length is longer than the cropped chord length; positioning the airfoil repair component with respect to the cropped airfoil; and passing current through the cropped airfoil electrode and the repair component electrode to attach the airfoil repair component to the cropped airfoil and form a repaired airfoil.

The method of any preceding clause, further comprising coining the cropped airfoil to remove a twist from the cropped airfoil.

The method of any preceding clause, wherein positioning the airfoil repair component with respect to the cropped airfoil comprises locating the repair component electrode through a feedback system to ascertain at least one of a size and a position of the airfoil repair component with respect to the cropped airfoil.

The method of any preceding clause, wherein positioning the airfoil repair component with respect to the cropped airfoil comprises manipulating an alignment assembly to reposition the airfoil repair component along at least one independent axis defined by the cropped airfoil.

The method of any preceding clause, wherein passing current through the cropped airfoil electrode and the repair component electrode comprises welding the airfoil repair component to the cropped airfoil through solid state resistance welding.

The method of any preceding clause, further comprising post-joining processing the repaired airfoil to obtain the net shape of the original airfoil.

The method of any preceding clause, where post-joining processing comprises machining the repaired airfoil.

The method of any preceding clause, wherein post-joining processing comprises deformation processing the repaired airfoil.

The method of any preceding clause, wherein deformation processing the repaired airfoil comprises cold working the repaired airfoil.

An airfoil repair system comprising a repair component electrode for receipt of an airfoil repair component, the repair component electrode comprising a repair component electrode insert removable with respect to a repair component electrode body, the repair component electrode insert surrounding at least a portion of the airfoil repair component; and a tooling assembly for positioning the airfoil repair component with respect to a cropped airfoil.

The airfoil repair system of any preceding clause, wherein the cropped airfoil is an airfoil from which a damaged portion has been removed.

The airfoil repair system of any preceding clause, wherein the cropped airfoil comprises a dovetail configured to be received within a complementarily shaped dovetail slot in a rotor disk.

The airfoil repair system of any preceding clause, wherein the cropped airfoil is integrally formed with a rotor disk as part of a blisk.

The airfoil repair system of any preceding clause, further comprising a cropped airfoil electrode for receipt of the cropped airfoil.

The airfoil repair system of any preceding clause, wherein the tooling assembly is configured to position the airfoil repair component received within the repair component electrode adjacent to the cropped airfoil received within the cropped airfoil electrode for a joining processing to attached the airfoil repair component to the cropped airfoil.

The airfoil repair system of any preceding clause, wherein the tooling assembly comprises a feedback system including at least one feedback device.

The airfoil repair system of any preceding clause, wherein the feedback device comprises at least one camera.

The airfoil repair system of any preceding clause, wherein the feedback device comprises at least one measurement gage.

A method of repairing an airfoil comprising disposing a cropped airfoil in a cropped airfoil electrode; disposing an airfoil repair component within a repair component electrode, the repair component electrode comprising a repair component electrode insert removably received within a repair component electrode body; positioning the airfoil repair component with respect to the cropped airfoil; and conducting a joining process to attach the airfoil repair component to the cropped airfoil and form an airfoil.

The method of any preceding clause, further comprising removing a damaged portion of the airfoil to form the cropped airfoil.

The method of any preceding clause, wherein conducting a joining process comprises passing a current through the cropped airfoil electrode and the repair component electrode.

The method of any preceding clause, wherein passing the current through the cropped airfoil electrode and the repair component electrode includes solid state resistance welding the airfoil repair component received in the repair component electrode to the cropped airfoil received in the cropped airfoil electrode.

The method of any preceding clause, further comprising obtaining a net shape of the airfoil.

The method of any preceding clause, wherein obtaining the net shape of the airfoil comprises machining the airfoil.

The method of any preceding clause, wherein obtaining the net shape of the airfoil comprises deformation processing the airfoil.

This written description uses examples to disclose the present subject matter, including the best mode, and also to enable any person skilled in the art to practice the disclosure, including making and using any devices or systems and performing any incorporated methods. The patentable scope of the present disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An airfoil repair system, comprising:
a cropped airfoil comprising a cropped airfoil attachment section and a cropped first side opposite a cropped second side, the cropped first side and the cropped second side each extending axially between a cropped first edge and a cropped second edge to define a cropped chord length;
an airfoil repair component comprising a body having a repair first side opposite a repair second side, the body defining a repair attachment section for attaching the airfoil repair component to the cropped airfoil at the cropped airfoil attachment section, the repair attachment section extending axially between a repair first edge and a repair second edge to define a repair chord length, the repair attachment section being oversized with respect to the cropped airfoil attachment section such that the repair chord length is longer than the cropped chord length;
a repair component electrode for receipt of the airfoil repair component, the repair component electrode comprising a repair component electrode insert removable with respect to a repair component electrode body, the repair component electrode insert surrounding at least a portion of the airfoil repair component; and
a retention assembly for positioning the airfoil repair component with respect to the cropped airfoil,
wherein the repair component electrode insert defines an inert gas manifold for receipt of an inert gas and a plurality of grooves extending from the inert gas manifold along the repair component electrode insert.

2. The airfoil repair system of claim 1, wherein the repair component electrode insert comprises a first half and a second half, each of the first half and the second half defining a portion of the inert gas manifold for receipt of the inert gas and each of the first half and the second half defining the plurality of grooves extending from the inert gas manifold along the respective half of the repair component electrode insert.

3. The airfoil repair system of claim 1, further comprising a cropped airfoil electrode for receipt of the cropped airfoil, wherein the cropped airfoil electrode comprises a dovetail block, a cropped airfoil electrode body, and the retention assembly, wherein the cropped airfoil comprises a dovetail receivable within the dovetail block, and wherein the dovetail block is removably secured to the cropped airfoil electrode body by one-handed manipulation of the retention assembly.

4. The airfoil repair system of claim 1, wherein the repair component electrode body defines a plurality of serrations, each serration having a change in direction.

5. The airfoil repair system of claim 1, wherein a blisk comprises the cropped airfoil, and wherein the retention assembly comprises a cropped airfoil portion for positioning the airfoil repair component with respect to the blisk.

6. The airfoil repair system of claim 1, wherein the retention assembly comprises a feedback system including at least one feedback device located to determine at least one of a size and a position of the airfoil repair component with respect to the cropped airfoil.

7. The airfoil repair system of claim 1, wherein the retention assembly comprises an alignment assembly, wherein the alignment assembly is configured to adjust the position of the airfoil repair component with respect to the cropped airfoil along one or more independent axes defined by the cropped airfoil.

8. The airfoil repair system of claim 1, wherein the repair component electrode comprises a point constraint, a line constraint, and a planar restraint with respect to the airfoil repair component, and wherein the point constraint is configured to be manipulated to release the airfoil repair component for removal from the repair component electrode.

9. An electrode assembly, comprising:
a repair component electrode;
a cropped airfoil electrode; and
a retention assembly and a dovetail block for positioning a cropped airfoil relative to an airfoil repair component to provide a stabilization force,
wherein the repair component electrode receives the airfoil repair component, and the cropped airfoil electrode receives the cropped airfoil, and
wherein an electrical current and a compressive axial force are passed through the repair component electrode, with the airfoil repair component positioned therein, and the cropped airfoil electrode, with the cropped airfoil positioned therein, to join the airfoil repair component to the cropped airfoil,
wherein the repair component electrode defines an inert gas manifold for receipt of an inert gas and a plurality of grooves extending from the inert gas manifold along the repair component electrode.

* * * * *